(12) United States Patent
Wiegers

(10) Patent No.: US 10,473,781 B2
(45) Date of Patent: Nov. 12, 2019

(54) DETERMINING A BOUNDARY ENCLOSING A REGION OF INTEREST FOR A BODY OF WATER

(71) Applicant: Garmin Switzerland GmbH, Schaffhausen (CH)

(72) Inventor: Michael R. Wiegers, Olathe, KS (US)

(73) Assignee: Garmin Switzerland GmbH (CH)

( * ) Notice: Subject to any disclaimer, the term of this patent is extended or adjusted under 35 U.S.C. 154(b) by 63 days.

(21) Appl. No.: 15/265,523

(22) Filed: Sep. 14, 2016

(65) Prior Publication Data
US 2018/0074195 A1    Mar. 15, 2018

(51) Int. Cl.
*G01S 15/89* (2006.01)
*G01S 15/02* (2006.01)
*G01S 7/62* (2006.01)

(52) U.S. Cl.
CPC ............ *G01S 15/89* (2013.01); *G01S 7/6218* (2013.01); *G01S 7/6272* (2013.01); *G01S 15/025* (2013.01)

(58) Field of Classification Search
CPC ................................ G01S 15/89; G01B 17/00
See application file for complete search history.

(56) References Cited

U.S. PATENT DOCUMENTS

| | | | |
|---|---|---|---|
| 3,886,487 A | 5/1975 | Walsh et al. | 367/92 |
| 4,323,992 A | 4/1982 | Tobin, Jr. | 367/108 |
| 4,340,936 A | 7/1982 | Mounce | 701/200 |
| 4,646,244 A | 2/1987 | Bateman et al. | 364/461 |
| 4,873,676 A | 10/1989 | Bailey et al. | 367/98 |
| 4,893,127 A | 1/1990 | Clark et al. | 342/386 |
| 5,220,507 A | 6/1993 | Kirson | |
| 5,339,085 A | 8/1994 | Katoh et al. | 342/180 |
| 5,398,188 A | 3/1995 | Maruyama | |
| 5,470,233 A | 11/1995 | Fruchterman et al. | 434/112 |

(Continued)

FOREIGN PATENT DOCUMENTS

JP    2002-288800 A    10/2002

OTHER PUBLICATIONS

Burlison, Undersee Explorer Shorelines, https://www.youtube.com/watch?v=Y7Ef-4T72oE , Mar 31, 2011. (Year: 2011).*

(Continued)

*Primary Examiner* — Hovhannes Baghdasaryan
(74) *Attorney, Agent, or Firm* — Samuel M. Korte; Max M. Ali

(57) ABSTRACT

Various techniques are described that relate to the manner in which marine devices may generate and display a water depth contour map while navigating a body of water. The contour map includes contour lines associated with determined contour line data that indicate geolocations of underwater terrain existing at depths of the body of water specified by the contour lines. A boundary enclosing a region of interest for the body of water may be determined and the contour map may include contour lines determined using the determined contour line data within the region of interest. The boundary may correspond to a natural shoreline along the perimeter of a body of water or a portion of the body of the water. The boundary corresponding to a shoreline may be automatically identified based on a stored map by identifying geographic locations along the perimeter of the body of water.

21 Claims, 11 Drawing Sheets

(56) References Cited

U.S. PATENT DOCUMENTS

| | | | |
|---|---|---|---|
| 5,543,789 A | 8/1996 | Behr et al. | |
| 5,559,707 A | 9/1996 | DeLorme et al. | |
| 5,592,382 A | 1/1997 | Colley | 701/207 |
| 5,635,924 A | 6/1997 | Tran et al. | |
| 5,684,476 A | 11/1997 | Anderson | 340/988 |
| 5,872,526 A | 2/1999 | Tognazzini | 340/961 |
| 5,878,368 A | 3/1999 | DeGraaf | |
| 5,893,081 A | 4/1999 | Poppen | |
| 5,999,882 A | 12/1999 | Simpson et al. | 702/3 |
| 6,055,478 A | 4/2000 | Heron | 701/213 |
| 6,061,629 A | 5/2000 | Yano et al. | |
| 6,104,316 A | 8/2000 | Behr et al. | |
| 6,198,428 B1 | 3/2001 | Sekine | 342/176 |
| 6,199,015 B1 | 3/2001 | Curtwright et al. | 701/213 |
| 6,279,851 B1 | 8/2001 | Huss et al. | 244/3.15 |
| 6,289,277 B1 | 9/2001 | Feyereisen et al. | |
| 6,314,370 B1 | 11/2001 | Curtright | 701/213 |
| 6,356,837 B1 | 2/2002 | Yokota et al. | 701/208 |
| 6,362,751 B1 | 3/2002 | Upparapalli | |
| 6,381,538 B1 | 4/2002 | Robinson et al. | |
| 6,385,538 B1 | 5/2002 | Yokota | 701/211 |
| 6,401,038 B2 | 6/2002 | Gia | 701/301 |
| 6,421,603 B1 | 7/2002 | Pratt et al. | 701/206 |
| 6,469,664 B1 | 10/2002 | Michaelson et al. | 342/357.13 |
| 6,473,003 B2 | 10/2002 | Horvath et al. | 340/945 |
| 6,556,206 B1 | 4/2003 | Benson et al. | 345/473 |
| 6,574,551 B1 | 6/2003 | Maxwell et al. | 701/209 |
| 6,577,947 B1 | 6/2003 | Kronfeld et al. | |
| 6,590,507 B2 | 7/2003 | Burns | |
| 6,653,947 B2 | 11/2003 | Dwyer et al. | 340/970 |
| 6,654,689 B1 | 11/2003 | Kelly | |
| 6,665,630 B2 | 12/2003 | Wei et al. | 702/155 |
| 6,734,808 B1 | 5/2004 | Michaelson et al. | 340/984 |
| 6,750,815 B2 | 6/2004 | Michaelson et al. | 342/357.13 |
| 6,845,324 B2 | 1/2005 | Smith | |
| 6,862,501 B2 | 3/2005 | He | 701/3 |
| 6,885,919 B1 | 4/2005 | Wyant et al. | 701/21 |
| 7,035,166 B2 | 4/2006 | Zimmerman et al. | 367/88 |
| 7,268,703 B1 | 9/2007 | Kabel et al. | 340/984 |
| 9,764,807 B2 | 9/2017 | Frisbie et al. | 701/21 |
| 2004/0003958 A1 | 1/2004 | Fujimoto et al. | 181/124 |
| 2004/0006423 A1 | 1/2004 | Fujimoto et al. | 701/201 |
| 2016/0061951 A1* | 3/2016 | Brown | G01S 15/8902 367/7 |

OTHER PUBLICATIONS

William, Undersee Explorer Intro Video 1, https://www.youtube.com/watch?v=9WrRP2z7FKc, Nov. 22, 2010 (Year: 2010).*
C-Series Display Reference Manual, Raymarine UK, Mar. 2006.
GPSMAP 3600C/3010C Color Chartplotter, Garmin Ltd., 2004.
GPSMAP 206/2010 Chartplotters Owner's Manual and Reference Guide, Garmin Ltd., 2001.

* cited by examiner

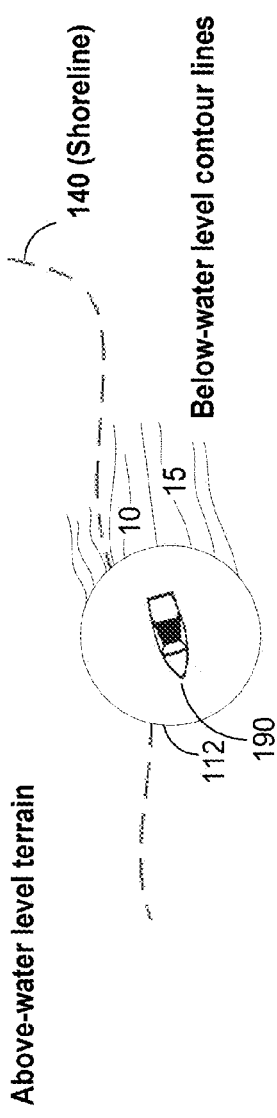
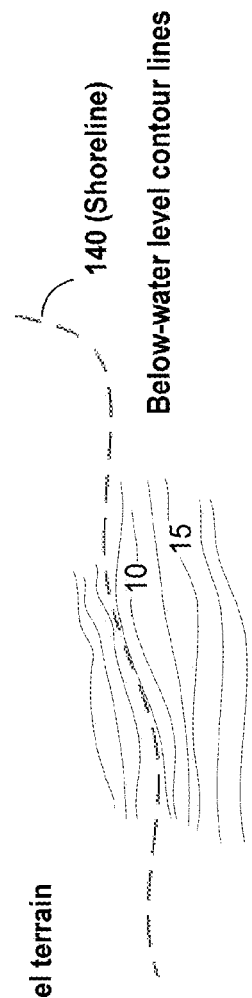
FIG. 1B
Prior Art
FIG. 1C
Prior Art

DETERMINING A BOUNDARY ENCLOSING A REGION OF INTEREST FOR A BODY OF WATER

BACKGROUND

The present disclosure relates generally to marine systems and, more particularly, to marine devices determining a boundary defining region of interest around the perimeter of, adjacent to the perimeter of or within a body of water. In the context of marine devices, a contour map may include contour lines that indicate a depth of underwater terrain within a body of water at a plurality of geolocations within the shoreline of the body of water. Similar to other types of cartography, each marine contour line may represent geographic locations having similar depth. For example, adjacent contour lines in close proximity (reduced separation of contour lines) represent a larger change in depth than adjacent contour lines spaced further apart (increased separation of contour lines). Thus, just as topographic maps above sea level indicate various elevations due to valleys, ridges, hills, etc., marine contour lines may represent the topography at the bottom of a body of water, such as a seabed, lakebed, riverbed, etc.

As shown in FIG. 1A, a traditional marine device, such as marine navigation devices 101 in environment 100, may acquire depth data using sensor devices, such as sonar transducers, and use the depth data to calculate contour lines for an area within a body of water 195 having a natural shoreline 140. As a map is generated for the body of water, these calculated contour lines may be included in (overlaid onto) the map to provide information relating to the topography at the bottom of a body of water. However, as shown in FIGS. 1B-1C, calculated depth data may be applied to geographic locations within an expanded area 112. Specifically, depth data and contour line data may be calculated for geographic areas that extend beyond geographic locations navigated by a boat 190 equipped with the conventional marine navigation device 101. As a result, the use of an expanded area 112 may result in contour line data being determined for above-water terrain along a natural shoreline 140 of a body of water 195 as boat 190 is navigated along the perimeter of body of water 195. Although the depth of an area within the perimeter of the body of water 195 may be accurately determined (e.g., a depth of 10 feet, 15 feet, etc.), conventional marine devices may estimate depths and contour lines for above-water level terrain within an expanded area 112 adjacent to the current location of boat 190. For instance, a determined depth in an area along the perimeter of a body of water 195 may be associated with the beach, coast, or any land that is not part of the body of water. The extent to which the above-water level terrain is associated with estimated depths and contour lines for areas within body of water 195 may be determined by the size of expanded area 112.

Traditional marine devices do not enable a user to define or otherwise identify a shoreline 140 of a body of water or an area of interest within the body of water. Some conventional marine navigation devices 101 may store a map of one or more bodies of water in memory and present the stored map in addition to contour lines determined by the conventional marine navigation device 101. Such conventional marine navigation devices 101 do not determine a shoreline 140 depicted in the map of a body of water 195 (e.g., geographic locations associated with the shoreline of body of water 195) and, thus, do not utilize the shoreline 140 to determine a region of interest enclosed by a boundary. As a result, traditional marine devices may allow for the collection and viewing of marine contour line data, but have several drawbacks or limitations.

SUMMARY

Embodiments of the present technology relate generally to marine devices (e.g., marine navigation devices, marine instruments, etc.) used in a marine vessel. The marine device may be mounted or otherwise located in a marine vessel and communicate with sonar or other suitable sensors to acquire depth information, as the marine vessel navigates a body of water. Embodiments are disclosed describing a marine device including a user interface (e.g., physical buttons, interactive touchscreen portions of display 212, switches, knobs, etc.) configured to receive a user selection indicating that the marine navigation device is placed into a boundary defining mode and a processing unit configured to determine a boundary enclosing a region of interest for a body of water. The boundary enclosing a region of interest may correspond to a natural shoreline along the perimeter of the body of water or a portion of the body of water.

The marine device may also generate geographic location data indicative of the geographic location of the marine device (and hence the marine vessel in which it is located) while the marine vessel navigates the body of water. The marine device may store the geographic location data and calculated contour line data in an associated memory unit to facilitate displaying a contour map that indicates the current geographic location of the marine vessel and the contour line data for that current geographic location.

Embodiments include determining a boundary enclosing the region of interest (ROI) in various manners. For example, in embodiments, the marine device may be put into a boundary defining mode and a processing unit may identify a path traveled (navigated) by the marine vessel as at least a portion of the boundary. In embodiments, the user interface may facilitate identification of the boundary. The marine device may also store a map of a geographic region including a body of water and automatically identify a natural shoreline of the body of water based on the stored map as the boundary enclosing the region of interest in the boundary defining mode. The marine device may automatically identify the natural shoreline by identifying geographic locations along the perimeter of the body of water based on the stored map.

The processing unit may access contour line data stored in the memory unit to present contour lines for the region of interest to a user as part of a contour map. As the marine vessel navigates the body of water, embodiments include the marine unit storing the calculated contour line data only for geographic locations within the boundary enclosing the region of interest and generating a contour map including contour lines for the geographic locations within the region of interest.

In various embodiments, the boundary may correspond to a natural shoreline along the perimeter of a body of water. In other embodiments, the boundary may not correspond to a natural shoreline and different types of data may be displayed outside the region of interest on the contour map. In one embodiment, the contour map may include contour lines within the region of interest but no contour lines in geographic areas between the boundary enclosing the region of interest and the shoreline (i.e., outside the region of interest). In other embodiments, the marine device may include preloaded contour line data. In accordance with such embodiments, the processing unit may display the calculated contour line data within the region of interest and the preloaded contour line data outside the boundary enclosing the region of interest to the shoreline. In this way, a user may define one or more customized regions within a body of water in which to collect and display calculated contour line data.

In other embodiments, once contour line data is calculated for a particular region of interest, stored information associated with the region of interest (e.g., the geographic coordinates associated with the region of interest, depth data, etc.) may be uploaded or transmitted to a remote server. The remote server may be configured to store contour map data received from several marine devices in a format that may be compatible with the other marine devices. In this way, marine devices may acquire and share information with other users.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

FIGS. 1A-1C are illustrations relating to conventional marine navigation systems;

DETAILED DESCRIPTION

Embodiments of the present invention provide functionality enabling a user to define a boundary enclosing a region of interest within which to determine and display contour lines determined using contour line data. The contour line data is calculated using depth data, which is calculated based on signals received from a sensor array. The region of interest may be the entire body of water if the boundary enclosing a region of interest corresponds to a natural shoreline along the perimeter of the body of water. Alternatively, a region of interest may be a portion of the body of water. In such embodiments, a region of interest enclosed by a boundary does not correspond to a natural shoreline along the perimeter of the body of water and the region of interest may be distant from the natural shoreline (e.g., near the center of the body of water).

The boundary enclosing the region of interest may be determined using various techniques. In some embodiments, the marine device may be put into a boundary defining mode, in which a processing unit may identify a path traveled by the marine vessel as the boundary enclosing the region of interest. In other embodiments, the marine device may include a user interface to facilitate the identification of a boundary enclosing a region of interest for a body of water (e.g., predefined shapes, past or future path of travel of a marine vessel, etc.). In additional embodiments, the marine device may store a map of a geographic region including a body of water and automatically identify a natural shoreline of the body of water based on the stored map as the boundary enclosing the region of interest.

Figure 1A:
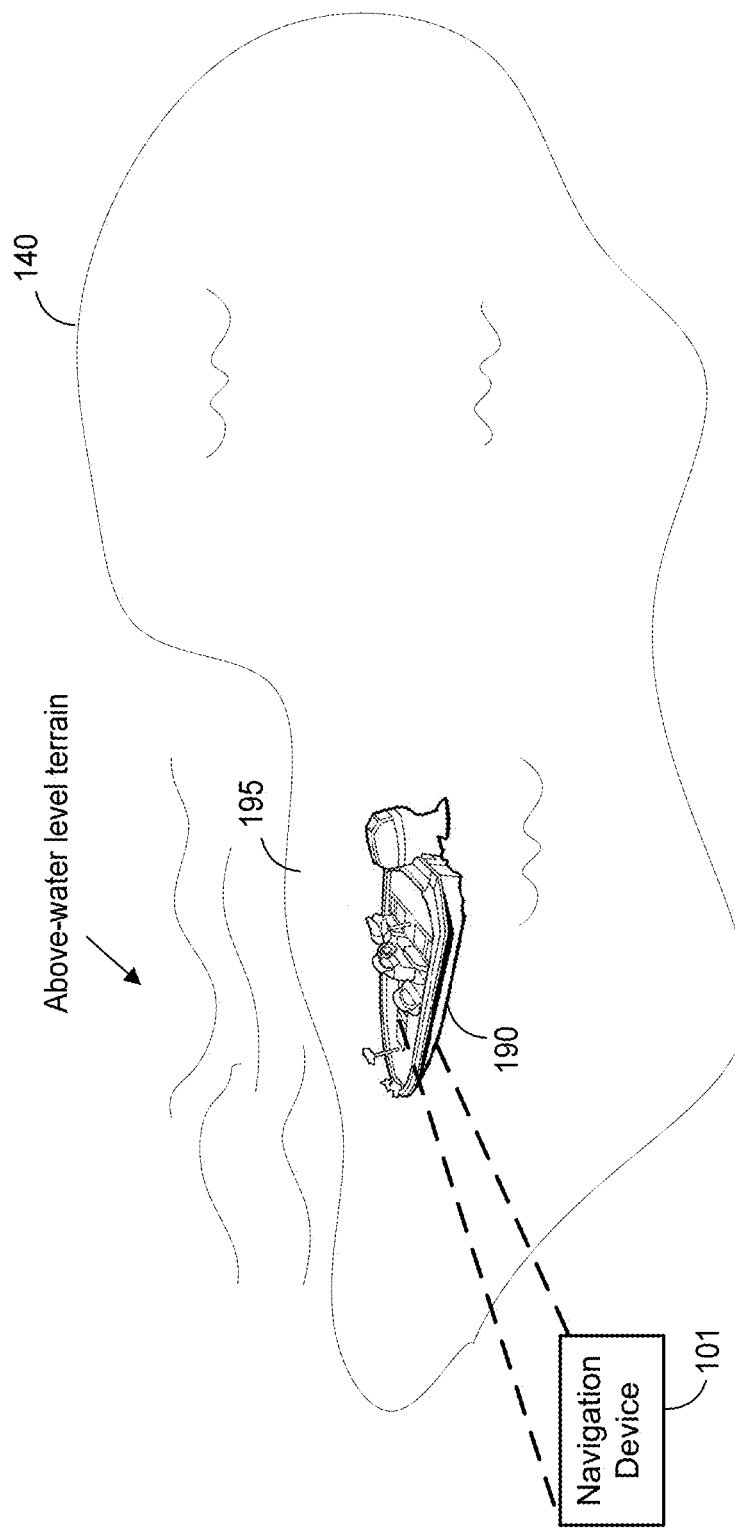
Figure 2:
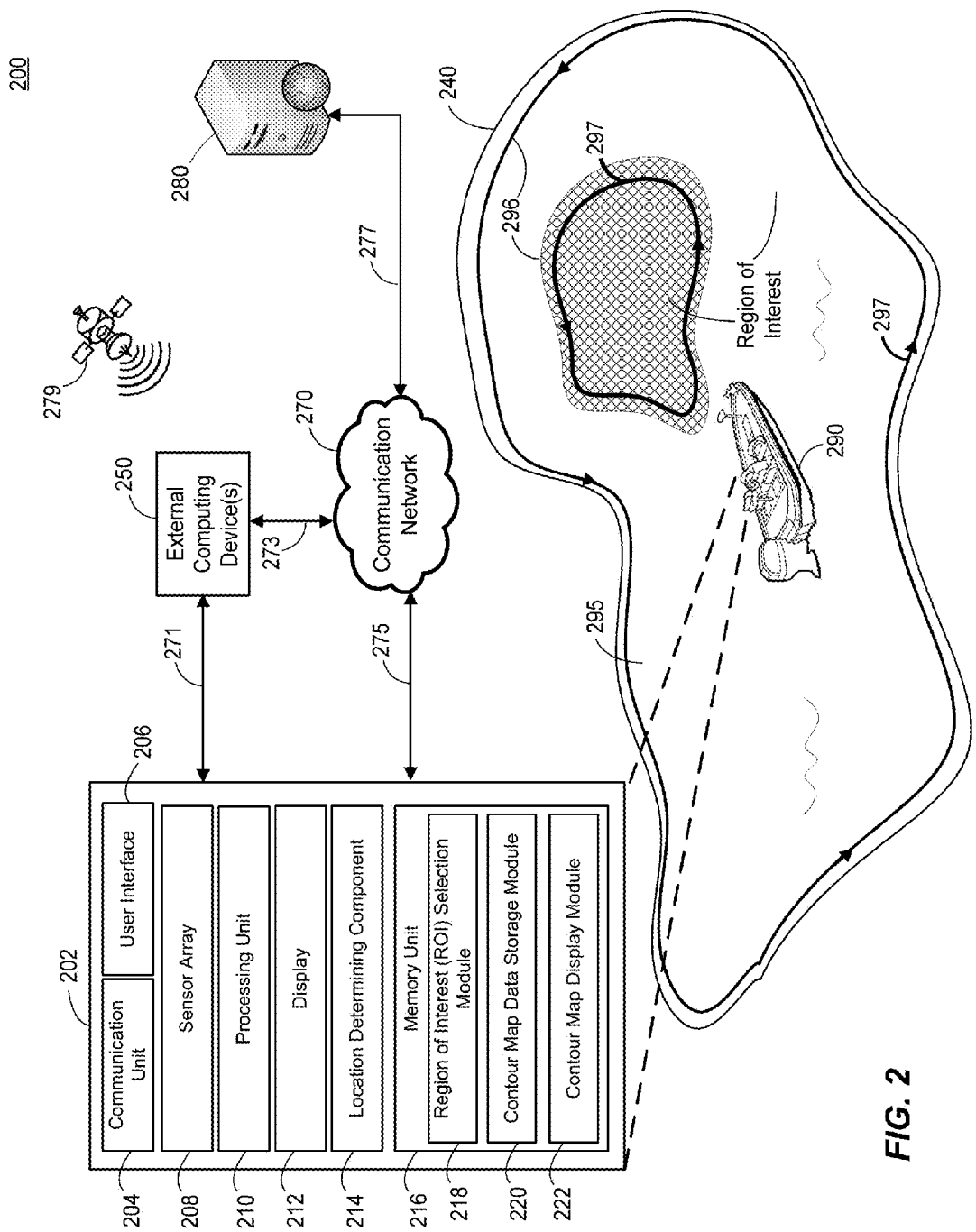
FIG. 2 is an illustration of a block diagram of an example marine system 200 in accordance with an embodiment of the present disclosure.

FIG. 2 is an illustration of a block diagram of an example marine system 200 in accordance with an embodiment of the present disclosure. As further discussed below, marine system 200 may facilitate a user navigating a body of water 295 with marine vessel 290 and, while doing so, calculating, storing, and/or displaying contour map data via a marine device, such as marine navigation device 202. A perimeter 240 of the body of water 295 separates the above water level terrain and the below water level terrain. The embodiments described herein also allow a user to select or otherwise define a boundary 296 enclosing a region of interest within body of water 295 having a natural shoreline 240. For example, boundary 296 may enclose the entire body of water 295, or a portion of the body of water 295. In embodiments where boundary 296 encloses a region of interest that is a portion of the body of water (does not correspond to for body of water 295), marine navigation device 202 may selectively display certain portions of the contour map data, such as contour line data, for areas within the region of interest from a first type of contour line data, while displaying other types of contour line data (e.g., a preloaded type of contour line data), or no data, outside of the region of interest for body of water 295.

Marine system 200 is shown in FIG. 2 as including a marine navigation device 202, one or more external computing devices 250, a communication network 270, a plurality of satellites 279, and one or more backend components 280. However, embodiments of marine system 200 may include a greater number or a lesser number of components as shown in FIG. 2. For example, in some embodiments, marine navigation device 202 may act as a standalone device and not require communications with one or more external computing devices 250 or communication network 270 to provide the functionality detailed herein, and thus one or more of external computing devices 250 and/or communication network 270 may be omitted. In other embodiments, marine navigation device 202 may communicate with and/or work in conjunction with one or more external computing devices 250 and/or communication network 270 to provide and/or supplement the functionality detailed herein.

To facilitate the exchange of data, marine navigation device 202, one or more external computing devices 250, communication network 270, and/or one or more backend components 280 may be configured to support communications in accordance with any suitable number and/or type of wired and/or wireless communication protocols. Examples of suitable communication protocols may include personal area network (PAN) communication protocols (e.g., BLUETOOTH), Wi-Fi communication protocols, radio frequency identification (RFID) and/or a near field communication (NFC) protocols, cellular communication protocols, Internet communication protocols (e.g., Transmission Control Protocol (TCP) and Internet Protocol (IP)), etc.

For example, communication link 271 may represent one or more wired communication links (e.g., a cable connection such as universal serial bus (USB) connection) and/or one or more wireless communication links (e.g., a BLUETOOTH connection) between marine navigation device 202 and one or more external computing devices 250. To provide another example, communication links 273, 275, and/or 277 may represent one or more wired communication links (e.g., a cable connection such as wired Ethernet connection) and/or one or more wireless communication links (e.g., a Wi-Fi connection, a BLUETOOTH connection, a cellular connection, etc.) between one or more of marine navigation device 202, one or more external computing devices 250, communication network 270, and/or one or more backend components 280.

One or more external computing devices 250 may be configured to communicate with marine navigation device 202 and/or one or more backend components 280 via communication network 270. In doing so, one or more external computing devices 250 may facilitate communications between marine navigation device 202 and one or more backend components 280 via communication network 270 and communication links 271, 273, and 277. For example, a user may upload contour map data to one or more external computing devices 250, which may in turn upload or otherwise transmit the contour map data to one or more backend components 280.

Thus, in some embodiments, marine navigation device 202 may communicate indirectly with one or more backend components 280 to send data to one or more backend components 280 and/or to receive data from one or more backend components 280. In other embodiments, marine navigation device 202 may communicate directly with one or more backend components 280 via communication network 270 to send data to and/or receive data from one or more backend components 280 without necessarily communicating via one or more external computing devices 250.

For example, marine navigation device 202 may communicate with one or more external computing devices 250 or backend components 280 to transmit cartographic data collected by the marine navigation device 202 and/or to receive updated cartographic data from backend components 280. To provide another example, marine navigation device 202 may upload calculated contour map data for a particular region of interest to one or more backend components 280. In embodiments, marine navigation device 202 may download contour map data uploaded to one or more backend components 280 by other marine navigation devices including or lacking contour map data for the region of interest.

In an embodiment, one or more of external computing devices 250 may include any suitable number and/or type of computing devices configured to communicate with and/or exchange data with marine navigation device 202 and/or one or more backend components 280. For example, one or more of external computing devices 250 may be implemented as a personal computing device (e.g., a smartphone, tablet, laptop, phablet, netbook, notebook, pager, personal digital assistant (PDA), a wearable computing device, etc.). To provide additional examples, one or more of external computing devices 250 may be implemented as any suitable type of computing device capable of wired and/or wireless communication (e.g., a desktop computer).

In an embodiment, one or more backend components 280 may include any suitable number and/or type of computing devices configured to communicate and/or exchange data with marine navigation device 202 and/or one or more external computing devices 250. For example, one or more backend components 280 may store data received from marine navigation device 202 and/or one or more external computing devices 250, and make this data available to other marine navigation devices. Thus, in various embodiments, one or more backend components 280 may be implemented as one or more servers, databases, etc.

Communication network 270 may include any suitable number of nodes, additional wired and/or wireless networks, etc., in various embodiments. For example, in an embodiment, communication network 270 may be implemented with any suitable number of base stations, landline connections, internet service provider (ISP) backbone connections, satellite links, public switched telephone network (PSTN) connections, local area networks (LANs), metropolitan area networks (MANs), wide area networks (WANs), any suitable combination of local and/or external network connections, etc. To provide further examples, communication network 270 may include wired telephone and/or cable hardware, satellite, cellular phone communication networks, etc. In various embodiments, communication network 270 may provide marine navigation device 202 and/or one or more external computing devices 250 with connectivity to network services, such as Internet services, for example, to facilitate communications with one or more backend components 280.

Marine navigation device 202 may be implemented as any suitable type of portable and/or mobile device configured to provide marine navigation functionality. For example, marine navigation device 202 may be integrated into marine vessel 290 and/or be an aftermarket device that is mounted on or otherwise located in marine vessel 290. In an embodiment, marine navigation device 202 may include a communication unit 204, a user interface 206, a sensor array 208, a processing unit 210, a display 212, a location determining component 214, and a memory 216. Marine navigation device 202 may include additional elements such as, for example, power sources, memory controllers, memory card slots, ports, interconnects, etc., which are not shown in FIG. 2 or further described herein for purposes of brevity.

Communication unit 204 may be configured to support any suitable number and/or type of communication protocols to facilitate communications between marine navigation device 202, one or more of external computing devices 250, communication network 270, and/or one or more backend computing components 280. Communication unit 204 may be configured to receive any suitable type of information via one or more of external computing devices 250 and/or one or more backend computing components 280. Communication unit 204 may be implemented with any suitable combination of hardware and/or software to facilitate this functionality. For example, communication unit 204 may be implemented with any number of wired and/or wireless transceivers, ports, connectors, antennas, etc.

Communication unit 204 may be configured to facilitate communications with one or more of external computing devices 250 and/or one or more backend computing components 280 using different types of communication protocols. For example, communication unit 204 may communicate with a desktop computer that is included as one or more of external computing devices 250 via a universal serial bus (USB) communication protocol and with one or more backend computing components 280 via communication network 270 using a cellular communication protocol. Communication unit 204 may be configured to support simultaneous or separate communications between one or more of external computing devices 250 and/or one or more backend computing components 280.

User interface 206 may be configured to facilitate user interaction with marine navigation device 202 and/or to provide feedback to a user. In an embodiment, a user may interact with user interface 206 to change various modes of operation, to initiate certain functions, to modify settings, set options, etc., which are further discussed below. For example, user interface 206 may include physical buttons, a user-input device such as one or more interactive touchscreen portions of display 212 (e.g., an on-screen "soft" keyboard, buttons, menus, switches, etc.) displayed on display 212, switches, knobs, etc., integrated as part of navigation device 202 that may have dedicated and/or multipurpose functionality, etc.

Sensor array 208 may be implemented as any suitable number and/or type of sensors configured to measure, monitor, and/or quantify one or more characteristics of marine navigation device 202's environment using received SONAR signals. Sensor array 208 may be configured to generate signals indicative or associated with the depth underwater terrain under the marine vessel 290 continuously or in accordance with any suitable recurring schedule, such as, for example, on the order of several milliseconds (e.g., 10 ms, 200 ms, etc.), once per every second, once every 5 seconds, once per every 10 seconds, once per every 30 seconds, once per minute, etc.

In an embodiment, sensor array 208 may be implemented as any suitable number and/or type of sensors (e.g., one or more SOund NAvigation and Ranging (SONAR) transducers) configured to generate signals indicative of measurements of a depth of a body of water associated with various geolocations. For instance, sensor array 208 may be a single transducer with a circular transmitting face that outputs a conical beam directly under the marine vessel 290 having a marine navigation device 202. Processing unit 210 may utilize these signals to calculate, generate, and/or store depth data indicating depth values for geolocations traveled by the marine vessel on the body of water based on the signals and store the determined depth values in the memory unit 216.

Processing unit 210 may further utilize the depth values to calculate contour line data, which may form part of a contour map for a particular area of a body of water. As further discussed below, processing unit 210 may correlate or associate the depth of water interpreted from the received signals to geolocation data obtained via location determining component 214 to display contour line data on a contour map at the appropriate geographic locations within the body of water.

For example, sensor array 208 may include SONAR transducers configured to generate signals indicative or associated with the depth underwater terrain under the marine vessel 290 by emitting a conical (if the transducer has a circular transmitting face) or fan-shaped (if the transducer has a rectangular transmitting face) beam of sound waves in accordance with any suitable frequency or range of frequencies and receiving the returned sound waves reflected from the underwater terrain of the body of water or other object. Continuing this example, processing unit 210 may utilize the received SONAR signals to calculate and store depth data and/or digital elevation model (DEM) data to memory unit 216 based on an amount of time that elapses before the returned sound beam is received from underwater terrain of the body of water or other object. The DEM data may be a three-dimensional representation of determined depth for each geographic location of a body of water. In various embodiments, processing unit 210 may calculate the contour line data based upon any combination of the stored SONAR signals received from sensor array 208 (e.g., the depth data) and/or DEM data, which is further discussed below.

In addition, the backscatter intensity, the amplitude, the energy level, or a similar characteristic of the returned sound beam may indicate the density of the underwater terrain or objects in the path of the beam output by sensor array 208. In the case of the underwater terrain, a hardness value of the soil of the water bottom may be determined from the returned sound beam, which may be utilized to display scaled shades of varying hardness levels as part of a displayed contour map.

Sensor array 208 may additionally include other types of sensors not utilized for depth measurements but which may be useful for other navigational functions. For example, sensor array 208 may include one or more accelerometers, gyroscopes, compasses, speedometers, and/or magnetometers to facilitate the determination of the speed and/or direction of marine navigation device 202, which may be displayed to a user via display 212, for example.

Additional examples of suitable sensors that may be implemented as part of sensor array 208 to facilitate depth measurements or other types of useful measurements include perspiration detectors, barometers, thermometers, proximity sensors, light sensors (e.g., light intensity detectors), photodetectors, photoresistors, photodiodes, Hall Effect sensors, electromagnetic radiation sensors (e.g., infrared and/or ultraviolet radiation sensors), ultrasonic and/or infrared range detectors, humistors, hygrometers, altimeters, biometrics sensors (e.g., heart rate monitors, blood pressure monitors, skin temperature monitors), microphones, etc.

Display 212 may be implemented as any suitable type of display configured to facilitate user interaction, such as a touchscreen, and/or display contour map data to a user. In various embodiments, display 212 may be configured to work in conjunction with user interface 206 and/or processing unit 210 to detect user inputs upon a user interacting with one or more displayed interactive icons or other graphics presented on display 212, to identify user selections of objects presented on display 212, etc. For example, display 212 may be implemented as a capacitive touch screen display or a resistive touch screen display and may include displays such as plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, heads-up displays (HUDs), etc., or combinations thereof.

Location determining component 214 may be implemented as a satellite navigation receiver that works with a global navigation satellite system (GNSS) such as the global positioning system (GPS), the GLONASS system primarily used in the Soviet Union, the BeiDou system primarily used in China, or the Galileo system primarily used in Europe. The GNSS includes a plurality of satellites 279 in orbit about the Earth. The orbit of each satellite is not necessarily synchronous with the orbits of other satellites and, in fact, is likely asynchronous. A GNSS equipped device such as marine navigation device 202 is shown receiving spread spectrum satellite signals from the plurality of satellites 279. The spread spectrum signals continuously transmitted from each satellite use a highly accurate frequency standard accomplished with an extremely accurate atomic clock. Each of the plurality of satellites 279, as part of its data signal transmission, transmits a data stream indicative of that particular satellite. Marine navigation device 202 should acquire spread spectrum satellite signals from at least three satellites 279 for the receiver device to calculate its two-dimensional position by triangulation. Acquisition of an additional signal, resulting in signals from a total of four satellites, permits marine navigation device 202 to calculate its three-dimensional position.

Location determining component 214 and processing unit 210 may be configured to receive navigational signals from the plurality of satellites 279 and to calculate a current position of marine navigation device 202 as a function of the received signals. Location determining component 214 and processing unit 210 may also determine and store in memory unit 216 track logs or any other series of geographic coordinates corresponding to points along a route or other path traveled by a user possessing or in close proximity to marine navigation device 202. Location determining component 214 and/or processing unit 210 may also be configured to calculate routes to desired locations, provide instructions to navigate to the desired locations, display maps and other information on the display screen, and execute other functions described herein.

Location determining component 214 may include one or more processors, controllers, or other computing devices and memory so that it may calculate location and other geographic information without processing unit 210, or it may utilize the components of the processing unit 210. Further, location determining component 214 may be integral with processing unit 210 such that location determining component 214 may be configured to specifically perform the various functions described herein. Thus, processing unit 210 and location determining component 214 may be combined or be separate or otherwise discrete elements.

Location determining component 214 may include an antenna to assist in receiving the satellite signals, which is not shown in FIG. 2 for purposes of brevity. The antenna may be a patch antenna, a linear antenna, or any other suitable type of antenna that may be used with navigation devices. The antenna may be mounted directly on or in a housing of marine navigation device 202, or may be mounted external to such a housing.

Although embodiments of marine navigation device 202 may include a satellite navigation receiver, it will be appreciated that other location-determining technology may be used. For example, communication unit 204 may be used to determine the location of marine navigation device 202 by receiving data from at least three transmitting locations and then performing basic triangulation calculations to determine the relative position of marine navigation device 202 with respect to the transmitting locations. For example, cellular towers or any customized transmitting radio frequency towers may be used instead of satellites 279. With such a configuration, any standard geometric triangulation algorithm may be used to determine the location of marine navigation device 202.

In other embodiments, location determining component 214 need not directly determine the current geographic location of marine navigation device 202. For instance, location determining component 214 may determine the current geographic location through a communications network, such as by using Assisted Global Positioning System (A-GPS) by receiving communications from a combination of base stations and/or satellites 279, or from another electronic device. Location determining component 214 may even receive location data directly from a user. For example, a user may obtain location data for a navigated route before and after it has been completed from another satellite navigation receiver or from another source and then manually input the data into marine navigation device 202.

Processing unit 210 may be implemented as any suitable type and/or number of processors, such as a host processor of marine navigation device 202, for example. To provide additional examples, processing unit 210 may be implemented as an application specific integrated circuit (ASIC), an embedded processor, a central processing unit associated with marine navigation device 202, a graphical processing unit (GPU), etc.

Processing unit 210 may be coupled with and/or otherwise configured to communicate, control, operate in conjunction with, and/or affect operation of one or more of communication unit 204, user interface 206, sensor array 208, display 212, location determining component 214, and/or memory unit 216 via one or more wired and/or wireless interconnections, such as any suitable number of data and/or address buses, for example. These interconnections are not shown in FIG. 2 for purposes of brevity.

For example, processing unit 210 may be configured to retrieve, process, and/or analyze data stored in memory unit 216, to store data to memory unit 216, to replace data stored in memory unit 216, to display information on display 212, to receive, process, and/or interpret SONAR signals received from sensor array 208, to process user interactions via user interface 206, to determine a location of marine navigation unit 202 based upon geographic location data generated via location determining component 214, to calculate depth and/or contour map data such as contour lines, to identify or otherwise determine region of interests, to cause display 212 to selectively display calculated contour line data inside of a defined region of interest but not outside of the region of interest, etc.

In accordance with various embodiments, memory unit 216 may be implemented as a computer-readable non-transitory storage device that may include any suitable combination of volatile (e.g., a random access memory (RAM), or non-volatile memory (e.g., battery-backed RAM, FLASH, etc.). Memory unit 216 may be configured to store instructions executable on processing unit 210, such as the various memory modules illustrated in FIG. 2 and further discussed below, for example. These instructions may include machine-readable instructions that, when executed by processing unit 210, cause processing unit 210 to perform various acts as described herein.

Memory unit 216 may also be configured to store any other suitable data used in conjunction with marine navigation device 202, such as data received from one or more of external computing devices 250 and/or one or more backend computing components 280 via communication unit 204, depth data generated using signals received from sensor array 208, cartographic data, contour map data, geographic location data associated with various bodies of water, user-defined ROIs, calculated contour line data associated with a defined region of interest, preloaded contour line data, etc.

Furthermore, memory unit 216 may be configured to store depth data, such as DEM data, that generally includes location information, such as coordinates, for a plurality of geolocations and the determined depth (or elevation) for each geolocation traveled by a marine navigation device 202. In various embodiments, the location information may be positioned at the intersection points of a geographical grid associated with a particular region of a body of water. Associated with each geolocation may be a value for a depth or an elevation, which may be a depth below or an elevation above sea level, of the terrain. Marine navigation device 202 may determine that a geographic location is associated with a body of water based on a depth level determined for the body of water below sea level. The DEM data may include depth data for substantially all of a body of water. In addition, the depth or DEM data is typically stored in memory unit 216 before marine navigation device 202 is utilized by processing unit 210 for various determinations and/or calculations while the marine vessel 290 navigates a body of water.

Region of interest selection module 218 is a region of memory unit 216 configured to store instructions, that when executed by processing unit 210, cause processing unit 210 to perform various acts in accordance with applicable embodiments as described herein. In an embodiment, region of interest selection module 218 includes instructions that, when executed by processing unit 210, cause processing unit 210 to determine or otherwise identify a boundary 296 enclosing a region of interest within a body of water 295, and to store data indicative of the region of interest in any suitable portion of memory unit 216. Data indicative of the boundary 296 and the enclosed region of interest may each constitute, for example, a range of geographic coordinates associated with boundary 296 and the geographic areas enclosed by boundary 296 within a body of water 295. In various embodiments, processing unit 210 may execute instructions stored in region of interest selection module 218 to identify boundary 296 enclosing the region of interest in a number of different ways.

For example, a user may interact with user interface 206 to place marine navigation unit 202 into a boundary defining mode. Once placed into boundary defining mode, processing unit 210 may identify and store geographic coordinates obtained via location determining component 214, such that, as marine vessel 290 navigates body of water 295, the path traveled by marine vessel 290 may be traced until the changes in the geographic coordinates indicate that marine vessel 290 has traveled a path that may be associated with boundary 296. Processing unit 210 may, upon receiving the user selection, monitor changes in the geographic location data to determine a path traveled by the marine vessel 290 and determine the traveled path as at least a portion of boundary 296.

In embodiments, the path traveled by marine vessel 290 may fully enclose a region of interest. For example, marine vessel 290 may travel a path that fully encloses a region of interest (i.e., the marine vessel 290 returns to its approximate starting location when the marine device was placed into a boundary defining mode). The path fully enclosing the region of interest may be associated with boundary 296.

In other embodiments, the path traveled by marine vessel 290 may partially enclose a region of interest by providing one or more portions of a boundary fully or partially enclosing the region of interest. For example, marine vessel 290 may travel a path that provides a portion (e.g., northern perimeter, eastern perimeter, southern perimeter, western perimeter, or any combination thereof) of a region of interest. The traveled path(s) partially enclosing the region of interest may be determined to form at least a portion of boundary 296.

Traveling a path fully enclosing the region of interest may be undesirable or impractical for a region of interest that is very large or a region of interest along a natural shoreline 240 of a body of water 295 that is not fully enclosed by a natural shoreline 240 (e.g., Gulf of Mexico, San Francisco Bay, Atlantic Ocean along the east coast of the United States, etc.). In such cases, processing unit 210 may determine the traveled path to form at least a portion of boundary 296 that forms a perimeter of a region of interest associated with a portion of the body of water 295.

Boundary 296 may partially enclose a region of interest by defining only one side of the region of interest. For instance, a user may navigate marine vessel 290 to travel along a southern coast of a large body of water and processing unit 210 may determine a boundary 296 limited to or including the traveled path such that the above-water terrain along the southern coast (the path of travel) is excluded from a region of interest (area north of the path of travel). Processing unit 210 may apply the techniques detailed herein to only the portion of the region of interest along boundary 296. Boundary 296 may correspond to traveled path 297 or boundary 296 may correspond to an offset direction and distance applied to traveled path 297. If a determined boundary 296 partially encloses a region of interest, such as existing on only one side of the region of interest, and boundary 296 is offset a certain direction and distance from a traveled path 297, processing unit 210 may apply the techniques detailed herein relating to the presentation of a contour map within the region of interest partially enclosed by boundary 296. For instance, processing unit 210 may associate a water depth of zero feet only along boundary 296, while determining a region of interest based on boundary 296.

Figure 3A:
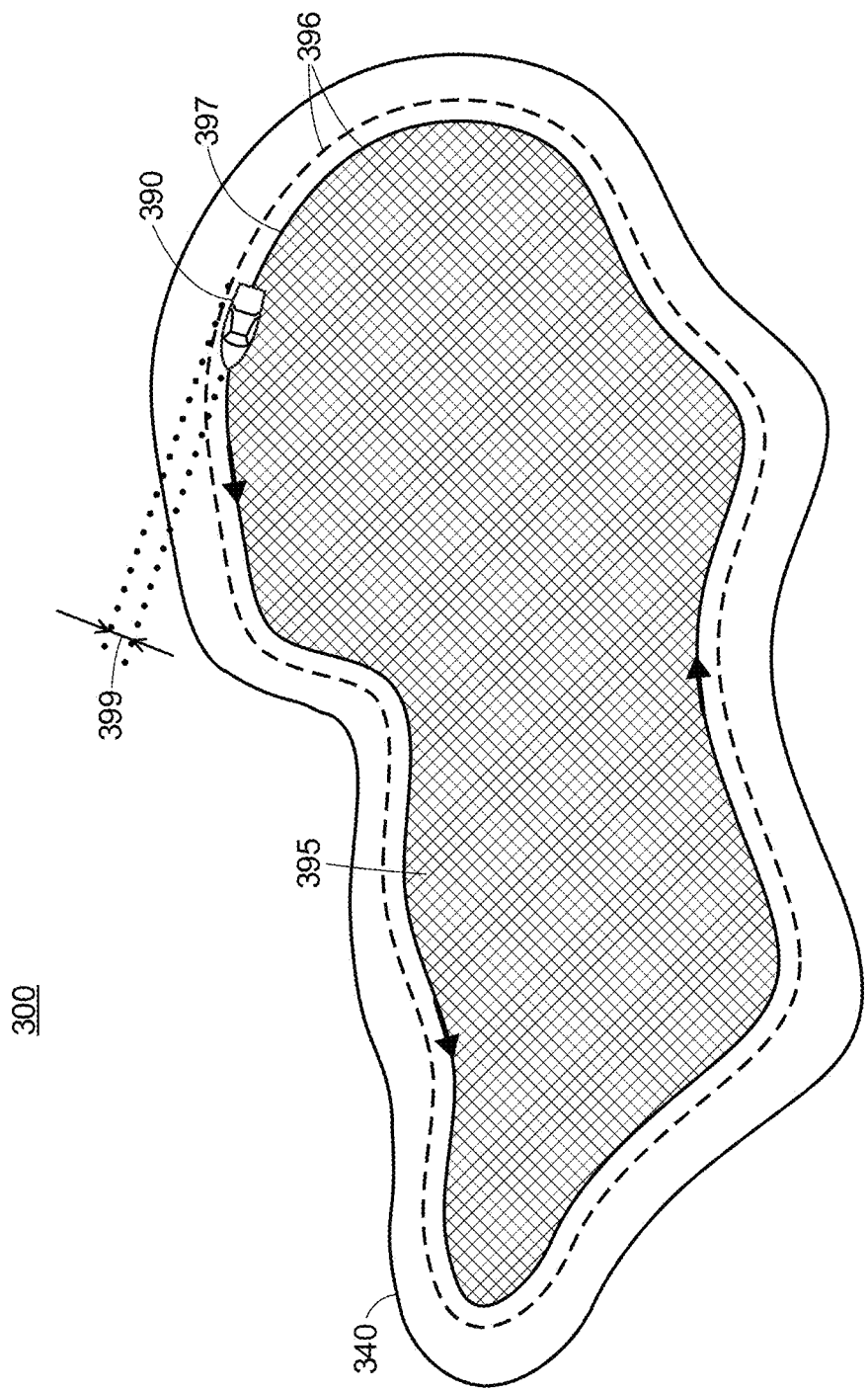
FIGS. 3A-3B are illustrations to facilitate the identification of a user-defined region of interest in accordance with various embodiments of the present disclosure.
Figure 3B:
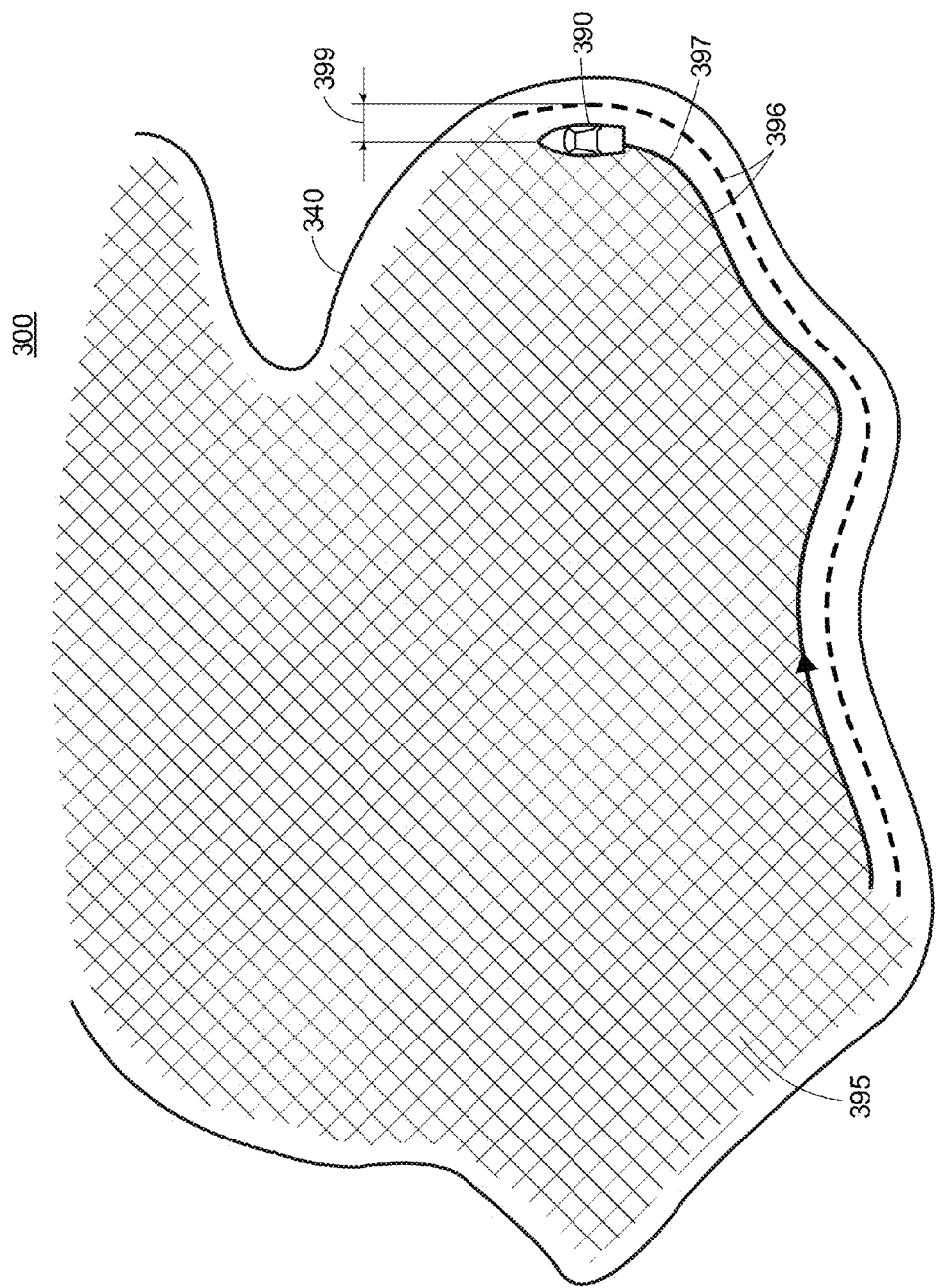

As shown in FIG. 3B, a region of interest may be partially enclosed (e.g., on one side) by a boundary 296. In embodiments, a region of interest may be determined by processing unit 210 to exist in a predetermined direction and distance. For instance, processing unit 210 may determine a region of interest to extend 5 nautical miles in the northern direction of a boundary 296 adjacent to a shoreline that exists to the south of traveled path 297 (land is to the south of the shoreline and the body of water is to the north of the shoreline along a traveled path 397). Similarly, processing unit 210 may determine a region of interest based on a boundary 296 along two sides of the region of interest. For instance, processing unit 210 may utilize a determined boundary 296 for the southern and eastern sides of a region of interest based on a traveled path 397 to automatically determine corresponding northern and eastern sides of the region of interest (i.e., fully enclosing the region of interest with boundary 296 and an estimated perimeter based on boundary 296). In other embodiments, processing unit 210 may utilize a determined boundary 296 for the southern and eastern portions of a region of interest based on a traveled path 397 and not apply the determined boundary for any other portion of the body of water 395.

As shown in FIG. 2, the region of interest may be the entire body of water 295, if the boundary 296 is a perimeter along the natural shoreline 240 of the body of water 295, or a portion of the body of water 295, if boundary 296 is entirely within the natural shoreline 240 of the body of water 295 (e.g., a region of interest near the center of body of water 295). Marine vessel 290 may travel a path 297 in a clockwise or a counterclockwise direction. For example, marine vessel 290 may travel a path 297 on body of water 295 in a counterclockwise direction along a natural shoreline 240 forming the perimeter of the body of water 295. Alternatively, marine vessel 290 may travel a path 297 around any portion of body of water 295 in a counterclockwise direction in any shape enclosing a region of interest, as marine vessel 290 will not be restricted by the natural shoreline 240 along the perimeter of the body of water 295 (e.g., path 297 enclosing a region of interest may be at the center of the body of water 295). Marine navigation device 202 may associate traveled path 297 with boundary 296.

In embodiments, processing unit 210 may associate a water depth of zero with boundary 296. For instance, processing unit 210 may enter or replace an existing depth value stored in memory unit 216 for geographic locations associated with boundary 296. In implementations, perimeter 240 of body of water 296 may correspond to determined boundary 296 such that the estimated locations of zero water depth correspond to the actual shoreline. For instance, boundary 296 may correspond to the entire natural shoreline 240 or boundary 296 may correspond to a portion of the natural shoreline 240 of the body of water 295 (e.g., northern shoreline, eastern shoreline, southern shoreline, western shoreline, or any combination thereof).

Processing unit 210 may monitor changes in the geographic coordinates that identify the location of marine vessel 290 until these coordinates indicate that a path 297 has been traversed by marine vessel 290 to determine boundary 296. Upon the geographic coordinates indicating that marine vessel 290 has traversed a path 297, processing unit 210 may then set or prompt the user to confirm that the traveled path 297 represented by these geographic coordinates as the boundary 296 enclosing of the region of interest.

The use of a boundary defining mode to determine geographic locations associated with boundary 296 may reduce the inclusion of depth data determined when the marine vessel 290 travels a path that is not intended to be used to calculate contour line data for presentation in a contour map. For instance, a user may interact with user interface 206 to place marine navigation unit 202 into a boundary defining mode and steer marine vessel 290 to travel in an "S pattern" (typical path for surveying) during a first time period on a body of water, such that depth data determined along the path of travel has no gaps (or has only minor gaps) between adjacent areas.

Subsequently, the user may interact with user interface 206 to discontinue use of the boundary defining mode for marine navigation unit 202 and operate marine vessel 290 in any path from a starting position towards a destination during a second time period. A user may not wish to include any of the depth data determined based on sensor information obtained during the second time period within the perimeter of the region of interest. Thus, in embodiments, the processing unit 210 may determine a boundary 296 enclosing a region of interest associated with surveying activity of the first time period, during which the user interacted with user interface 206, to place marine navigation unit 202 into a boundary defining mode, and exclude other paths of travel that were not associated with the surveying activity.

In embodiments, the memory unit 216 of marine navigation device 202 may store a map of a geographic region including a body of water 295 and processing unit 210 may automatically identify a natural shoreline 240 of the body of water 295 based on the stored map as the boundary 296 enclosing a region of interest. A marine navigation device may automatically identify a boundary 296 corresponding to natural shoreline 240 of body of water 295 by identifying geographic locations along the perimeter of the body of water 295 based on the stored map. For example, memory unit 216 may include a removable memory card, which is inserted into marine navigation device 202 and includes a stored map (e.g., graphic image, digital map information of geographic locations associated with above-water terrain and bodies of water, etc.) and processing unit 210 may evaluate the stored information to determine the location of a body of water 295, including a natural shoreline 240 along the perimeter of the body of water 295.

In other embodiments, the processing unit 210 may determine a boundary 296 based on the traveled path(s) 297 of the marine vessel 290 or depth data stored in memory unit 216 for a region of interest. The processing unit 210 may suggest or recommend the identified boundary 296 for a region of the interest to a user for selection or modification on display 212. For instance, the processing unit 210 may assess the amount or density of depth data stored in memory unit 216 for one or more regions of the body water to determine whether memory unit 216 has adequate depth data associated with the one or more regions to provide accurate contour lines for the geographic area. If the memory unit 216 has adequate depth data for a region of the body of water, processing unit 210 may determine a boundary 296 enclosing the region of interest such that the determined boundary 296 encloses a geographic area associated with the depth data stored in memory 216. In embodiments, processing unit 210 may determine that depth data calculated while one or more traveled paths 297 on body of water 295 sufficiently cover a region of interest such that accurate contour lines may be calculated for the geographic area. For example, the traveled path 297 of marine vessel 290 may be in an "S pattern," which is a commonly used path for surveying that typically reduces gaps in measurements for a region of interest.

To provide another example, processing unit 210 may continuously track and store geographic location data in any suitable part of memory unit 216 indicating a history of routes navigated by marine vessel 290 over a period of time. This functionality may be, for example, a default mode of marine navigation unit 202 or triggered by one or more conditions being met (e.g., on device power up, upon detecting a threshold amount of movement via a change in geographic coordinates, etc.). In any event, because memory unit 216 may store routes navigated by marine vessel 290, a user may interact with user interface 206 to place marine navigation unit 202 into a boundary selection mode (or a region of interest selection mode) to view and select portions of at least one of the stored routes as boundary 296. This may include, for example, display 212 presenting routes tracing the navigation of marine vessel 290 over body of water 295 from an initial starting point. A user may then select one or more portions of the presented routes that form a path and set this path as the boundary 296 enclosing the region of interest. In this way, embodiments facilitate a user defining the boundary 296 enclosing the region of interest based upon anticipated marine vessel navigation (e.g., in a boundary defining mode) or based upon past marine vessel navigation (e.g., in a region of interest selection mode).

To provide yet another example, a user may select or manually define a custom boundary 296 enclosing a region of interest. That is, in some embodiments, the boundary selection mode (or the region of interest selection mode) may not present a user with routes navigated by the marine vessel. Instead, the boundary selection mode may present a map that includes the body of water and the location of marine vessel 290 on the body of water. In accordance with such embodiments, a user may interact with user interface 206 to manually input a boundary 296 enclosing the region of interest.

In embodiments, processing unit 210 may determine a depth for a first geographic location traveled by marine navigation device 202 within marine vessel 290 and expand the determined depth to adjacent geographic locations near the first geographic location by associating the determined depth with the adjacent geographic locations. Processing unit 210 may repeat this process for each geographic location traversed by marine navigation device 202 within marine vessel 290. In embodiments, weighting or averaging may be applied to the adjacent geographic locations instead of applying the determined depth for the first geographic location to the adjacent geographic locations. This expanded area may be identified on a map presented on display 212. For instance, as discussed below in reference to FIGS. 5A-5C, the expanded area 512 may be circular.

In some embodiments, the boundary defining mode may facilitate boundaries to be defined in accordance with the same geographic locations navigated by the marine vessel, whereas other embodiments allow for the boundary to be defined by modifying these geographic locations. For example, as shown in FIGS. 3A and 3B, the region of interest selection module 218 may cause processing unit 210 to determine or otherwise identify a boundary 396 approximately corresponding to a natural shoreline 340 of body of water 395, and to store geographic locations associated with boundary 396 and to determine a region of interest at least partially enclosed by boundary 396 that may also be stored within any suitable portion of memory unit 216.

To facilitate this functionality, a user may interact with user interface 206 to place marine navigation unit 202 into the boundary defining mode and optionally specify an offset distance 399 in terms of a suitable measurement value (e.g., 20 feet, meters, etc.) and an offset direction (e.g., the starboard side of marine vessel 390) before navigating the marine vessel 390 on a route indicated by path 397 in the counterclockwise direction. In such a scenario, processing unit 210 may apply the user-selected offset direction and offset distance to the geographic coordinates represented by path 397 during navigation of the path 397, such that the determined depth data and/or boundary 396 represented, by the dashed line in FIGS. 3A and 3B, are stored in memory unit 216.

In other embodiments, a user may apply the user-selected offset direction 399 and distance to the geographic coordinates represented by path 397 after the geographic coordinates are obtained and stored in memory unit 216. For example, after marine vessel 390 navigates the path 397, embodiments include a user adjusting the boundary 396 that is originally represented by the path 397 to the boundary 396 indicated by the dashed lines offset from the path 397 by the offset distance 399. To do so, a user may interact with user interface 206 to enter the offset distance and direction after the marine vessel has already navigated the path 397. In such a case, the determined depth data and/or boundary 396 represented by the dashed line in FIG. 3A would then be associated with the user-defined region of interest and stored in memory unit 216. Such embodiments may be particularly useful, for example, when the boundary 296 is defined via a boundary defining mode by enabling boundary 296 to be offset in a direction towards a shoreline 340 of a body of water 295 without the marine vessel 290 navigating to a depth where marine vessel 290 could potentially run aground.

Figure 5A:
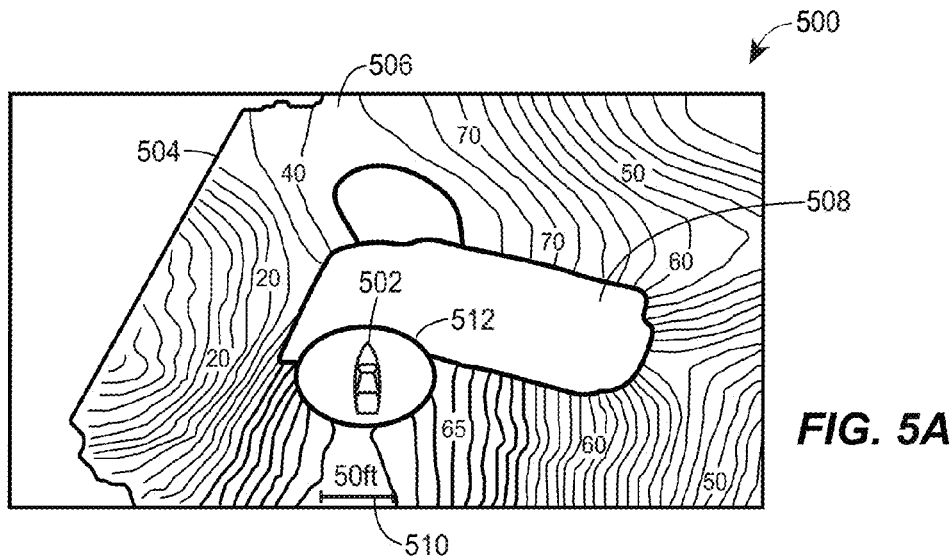
FIGS. 5A-5C are illustrations of example screenshots of displayed contour map data within a region of interest in accordance with various embodiments of the present disclosure.
Figure 5B:
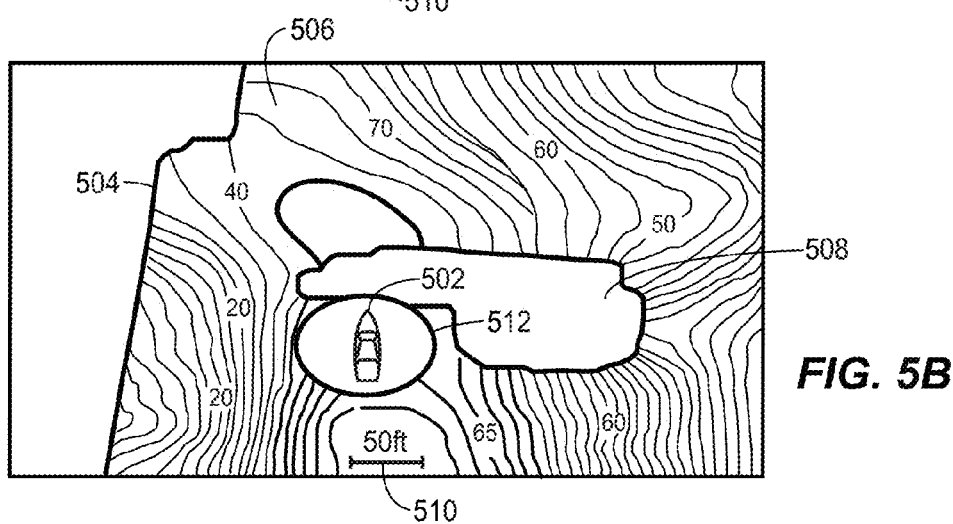
Figure 5C:
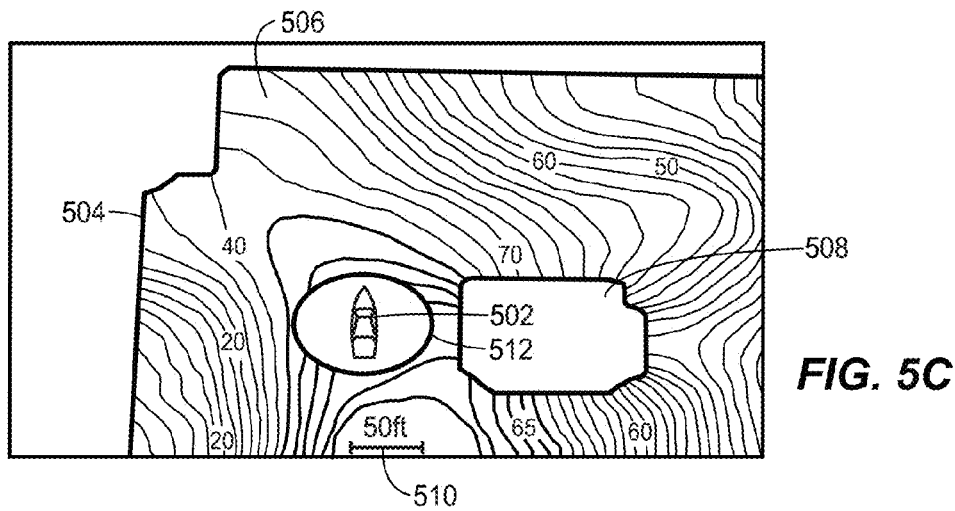

Referring back to FIG. 2, in embodiments, processing unit 210 may execute instructions stored in region of interest selection module 218 to extend or reduce the expanded area based on the offset distance and/or offset direction. For instance, as shown in FIGS. 5A-5C, this would result in the expanded area 512 having a circular shape with have a radius defined by the offset distance and direction(s) associated with the offset distance. Thus, expanded area 512 may be reduced in half, if the offset distance is changed from 10 feet to 5 feet.

When marine navigation device 202 is used in a boundary defining mode, various embodiments allow a user to interact with user interface 206 at any suitable time to dynamically adjust the offset direction, distance, and/or whether to apply any offset to the path while marine vessel 290 is actively tracing out a path to be associated with a boundary 296 at least partially enclosing a region of interest. For example, a user may apply an offset when marine navigation device 202 determines that marine vessel 290 is close to a natural shoreline 240, but not when marine vessel 290 moves further from the shoreline 240. In this way, a boundary 296 enclosing a user-defined region of interest may represent a combination of path segments actually navigated by marine vessel 290 and an offset.

Any of the user interactions described herein with marine navigation device 202, including the manual region of interest selection process, may be performed in accordance with any suitable techniques to select or manually define a boundary 296. For example, a user may trace a path along a map presented on display 212 by moving a cursor, selecting with a touch input using his finger, using a stylus, etc. To provide another example, user interface 206 may present, via display 212, predefined shapes such as ellipses, circles, squares, rectangles, etc., which a user may select and place over the body of water. The user may then adjust the size, shape, and position of the selected shape over the body of water as desired. Once a user is satisfied with the manually selected path, the user may interact with user interface 206 to set this path as the boundary 296 enclosing a region of interest.

With continued reference to FIG. 2, contour map data storage module 220 is a region of memory unit 216 configured to store instructions, that when executed by processing unit 210, cause processing unit 210 to perform various acts in accordance with applicable embodiments as described herein. In various embodiments, contour map data storage module 220 includes instructions that, when executed by processing unit 210, cause processing unit 210 to determine which portions of contour map data to store to memory unit 216 and when to do so. That is, processing unit 210 may execute instructions stored in contour map data storage module 220 to selectively determine and store various portions of contour map data to any suitable portion of memory unit 216 based upon one or more conditions, settings, and/or a current mode of operation of marine navigation device 202.

In embodiments, once a region of interest enclosed by boundary 296 has been identified, marine navigation device 202 may selectively store depth data and/or contour line data only for geographic locations of marine vessel 290 that are within the region of interest enclosed by boundary 296. To provide an illustrative example, while navigating body of water 295, processing unit 210 may execute instructions stored in contour map data storage module 220 to compare the current geographic location of marine navigation device 202 obtained via location determining component 214 to a set of geographic coordinates associated with boundary 296 and the region of interest. When processing unit 210 determines that marine vessel 290 is located within the user-defined region of interest, then processing unit 210 may calculate depth data based on received signals sensor array 208 and calculate contour line data based on the depth data only while processing unit 210 determines that marine vessel 290 is located within the region of interest enclosed by boundary 296. In this way, boundary 296 may function as a geofence that triggers the calculation and storage of depth data and calculated contour line data when a determined location of marine navigation device 202, mounted within marine vessel 290, is within the region of interest enclosed by boundary 296.

In various embodiments, processing unit 210 may determine and rely on the crossing of boundary 296 by marine navigation device 202 as an event causing various functions and operations to be performed by marine navigation device 202. For example, processing unit 210 may execute instructions stored in contour map data storage module 220 to activate one or more transducers that are part of sensor array 208 upon marine vessel 290 crossing boundary 296, and deactivating the same transducers of sensor array 208 once marine vessel 290 is outside of boundary 296. In doing so, processing unit 210 may calculate and store depth data and calculated contour line data only when marine vessel 290 is located within the region of interest defined by boundary 296.

To provide another example, contour line data may be calculated based on determined depth data using depth data based on a signal from sensor array 208 and stored for all geographic locations of marine vessel 290 while navigating body of water 295, but only presented on display 212 within the region of interest defined by boundary 296. These embodiments are further described below with reference to contour map display module 122.

In embodiments, once contour line data is calculated for a region of interest enclosed by boundary 296, processing unit 210 may execute instructions stored in contour map data storage module 220 to store contour map data for that region of interest in any suitable portion of memory unit 216. For example, a contour map for a region of interest may be based on the depth data determined using data or signals based on returned sonar beams from underwater terrain, geographic location data associated with the region of interest and/or its perimeter, the contour line data for locations of the marine vessel that are within the region of interest, etc.

Furthermore, embodiments include processing unit 210 executing instructions stored in contour map data storage module 220 to calculate or otherwise determine three-dimensional terrain data (DEM data) from depth data generated using signals received from sensor array 208. Three-dimensional terrain data (DEM data) may include depth or elevation data utilized by processing unit 210 to create a three-dimensional image of a body of water in accordance with any suitable techniques, such as those described in U.S. patent application Ser. No. 14/449,769, which was filed on Aug. 1, 2014, and is incorporated by reference in its entirety.

The three-dimensional terrain data (DEM data), which may be the calculated depth data or based on the depth data, may be stored as part of the contour map data for a particular body of water 295 in memory unit 216. The three-dimensional terrain data may be selectively determined and stored in memory unit 216 by processing unit 210 in accordance with the same conditions in which the contour line data is determined and stored in memory unit 216. For example, the three-dimensional terrain data and the contour line data may each be determined and stored when marine vessel 290 is within a region of interest. To provide another example, the contour line data may be determined and stored when marine vessel 290 is within a region of interest while three-dimensional terrain data may be continuously determined and stored by processing unit 210 while a user navigates marine vessel 290 regardless of the position of marine vessel 290 within body of water 295.

Once stored, the contour map data may be transmitted, uploaded, or otherwise communicated with other users. For example, a user may interact with user interface 206 to cause processing unit 210 and/or communication unit 204 to upload the contour map data to one or more external computing devices 250 and/or one or more backend components 280. One or more external computing devices 250 and/or one or more backend components 280 may store the contour line data in any suitable format that is compatible with other marine navigation devices, which may subsequently download and use the determined contour map data. In this way, multiple marine navigation devices may obtain custom contour maps for specific ROI locations for various bodies of water, and share these custom contour maps with other users, who may access them via a manufacturer's website and/or via one or more backend components 280.

Contour map display module 122 is a region of memory unit 216 configured to store instructions, that when executed by processing unit 210, cause processing unit 210 to perform various acts in accordance with applicable embodiments as described herein. In various embodiments, contour map display module 122 includes instructions that, when executed by processing unit 210, cause processing unit 210 to selectively display different portions of contour map data stored in memory unit 216 based upon the current geographic location of marine vessel 290.

In various embodiments, memory unit 216 may store various types of data associated with a contour map for a particular body of water, such as body of water 295, for example, as shown in FIG. 2. This contour map data may include contour line data and/or three-dimensional terrain data that is determined or calculated as described herein, e.g., via processing unit 210 working in conjunction with sensor array 208 and location determining component 214, as discussed above. Contour map data stored in memory unit 216 may include preloaded contour line data and/or preloaded three-dimensional terrain data (DEM data) associated with one or more bodies of water in addition to the determined DEM and contour map data determined by processing unit 210. The preloaded contour line data and/or preloaded three-dimensional terrain data may represent contour line data and/or three-dimensional terrain data that was obtained in a similar manner to the user's calculated data, but may be done by a different marine vessel.

For example, preloaded contour line data and/or preloaded three-dimensional terrain data for one or more bodies of water in a particular region may be stored in memory unit 216 prior to marine vessel 290 navigating body of water 295 (e.g., as part of an initial factory setup). To provide another example, a user may separately purchase a memory card having contour line data and/or preloaded three-dimensional terrain data for one or more bodies of water in a particular region, and transfer the contents of the memory card to memory unit 216. Alternatively, memory unit 216 may be considered to encompass external forms of media storage that are inserted into marine navigation device 202. To provide yet another example, a user may use the manufacturer's website via interaction with one or more external computing devices 250, download contour line data and/or preloaded three-dimensional terrain data for one or more bodies of water from one or more backend components 280, and transfer the downloaded contour line data and/or preloaded three-dimensional terrain data from one or more external computing devices 250 to memory unit 216.

In an embodiment, processing unit 210 may execute instructions stored in contour map display module 122 to compare a current geographic location of marine vessel 290 to a set of geographic coordinates forming a boundary 296. Processing unit 210 may cause display 212 to selectively store in memory unit 216 and/or selectively present via display 212 the calculated contour line data and/or the calculated three-dimensional terrain data determined by processing unit 210 in real-time only for areas of a map associated with the region of interest enclosed by boundary 296.

For geographic areas outside of the region of interest (and boundary 296), processing unit 210 may cause display 212 to display a combination of the preloaded contour line data, the preloaded three-dimensional terrain data, both, or neither, based upon default settings and/or user preferences. Furthermore, prior to acquiring contour line data and/or three-dimensional terrain data inside the region of interest, processing unit 210 may similarly cause display 212 to present either the preloaded contour line data, the preloaded three-dimensional terrain data, both, or neither. The details of this process are further discussed and illustrated below. In embodiments, processing unit 210 may control display 212 to present a combination of preloaded contour line data along with contour line data determined by processing unit 210 for the region of interest based on the determined depth data.

For example, processing unit 210 may execute instructions stored in contour map display module 122 to present, via display 212, an overhead image perspective of three-dimensional underwater terrain located in geographic locations passed by marine vessel 290. The three-dimensional image is not shown herein for purposes of brevity, but may be presented as appropriate according to zoom level settings and proximity to land of marine vessel 290, and may further include a three-dimensional perspective representation of the land at the natural shoreline 240 of body of water 295. In addition, the three-dimensional terrain data may include relief shading to indicate shadows of the underwater terrain as created by a natural or artificial light source.

Figure 4A:
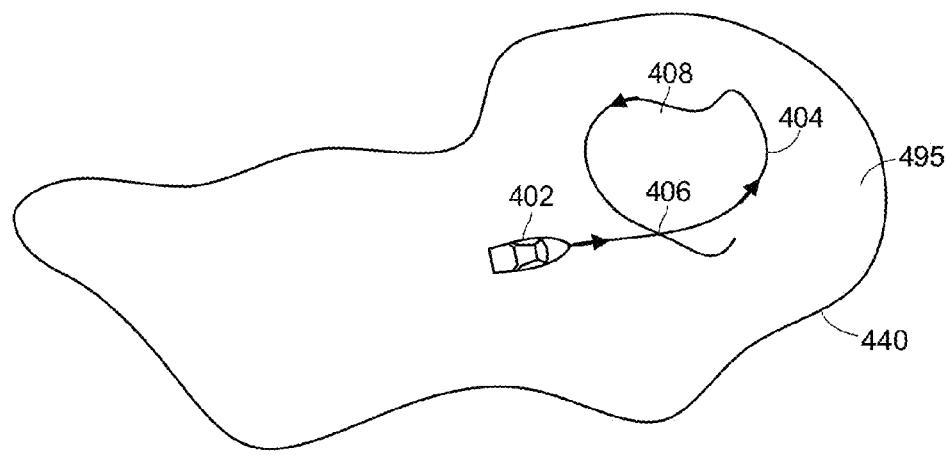
FIGS. 4A-4C are illustrations to facilitate the identification of a user-defined region of interest in accordance with various embodiments of the present disclosure.
Figure 4B:
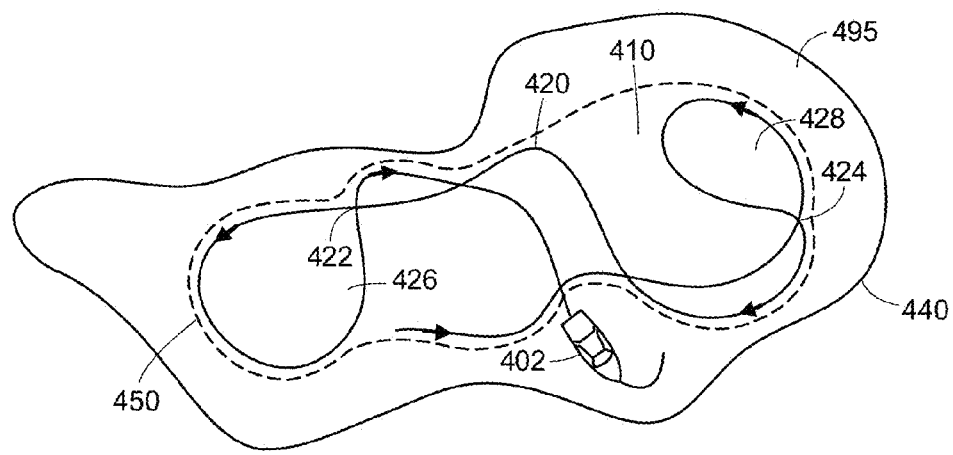
Figure 4C:
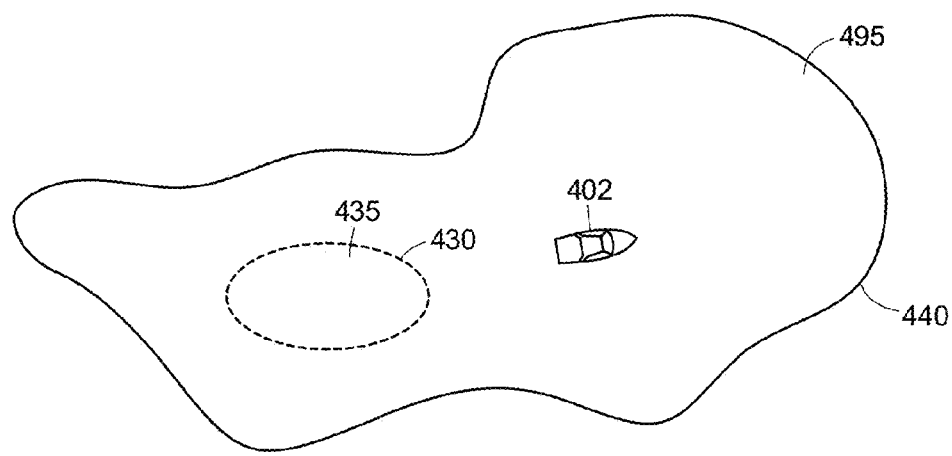

FIGS. 4A-4C are illustrations to facilitate the identification of a user-defined region of interest in accordance with various embodiments of the present disclosure. Each of FIGS. 4A-4C illustrates a body of water 495 that may be displayed via a suitable display 212 associated with a marine navigation device 202, in various embodiments. In this embodiment and additional ones disclosed herein, user interaction with various portions of screens are discussed in terms of the portions being "selected," by a user. Again, these user selections may be performed via any suitable gesture, such as a user tapping his finger or stylus to that portion of the screen and/or moving a cursor, for example.

FIG. 4A is an example relating to a boundary defining mode, as discussed above with reference to FIG. 2. As shown in FIG. 4A, a marine vessel 402 includes a marine navigation device 202 that determines a current location and indicates the current location of the marine vessel 402 over body of water 495 within natural shoreline 440. FIG. 4A shows a path navigated by the marine vessel 402 represented by line 404 as the marine vessel 402 navigates on body of water 495. The user may observe or follow a current geographic location on the display 212 and use line 404 as feedback to navigate the marine vessel 402 as desired to navigate a path that concludes at a starting location, which occurs at point 406. At this point, a user may interact with the marine navigation device 202 to select region of interest 408, which is enclosed by boundary 296 (formed by line 404). Once the region of interest has been selected by defining boundary 296, the user may continue to use the marine navigation device 202 collect or begin collecting depth data based on signals or data received from sensor array 208 and determine contour map data within region of interest 408.

FIG. 4B illustrates a traveled path 420 that has already been traveled by the marine vessel 202 that overlaps at a plurality of geographic locations, such as geographic locations 422 and 424. Processing unit 210 may identify one or more regions of interest based on traveled path 420. For instance, processing unit 210 may determine a portion of traveled path 420 to be a determined boundary enclosing a region of interest, such as region of interests 426 and 428, that may be a portion of the body of water. Such a boundary may enclose a region of interest that does not correspond to a natural shoreline along the perimeter of the body of water and that may be distant from the natural shoreline (e.g., near the center of the body of water).

Processing unit 210 may determine outer bounds 450 of one or more traveled paths 420 such that portions of traveled path 420 form a determined boundary enclosing a region of interest 410. In embodiments, processing unit 210 may assess the amount or density of depth data stored in memory unit 216 for region of interest 410 to determine whether memory unit 216 has adequate depth data associated with region of interest 410 for processing unit 210 to determine accurate contour lines for the geographic area. Processing unit 210 may determine a boundary enclosing a region of interest that is smaller than region of interest 410 to select a geographic area having adequate depth data stored in memory unit 216 for processing unit 210 to determine accurate contour lines for the geographic area.

In various embodiments, any suitable number of regions of interest 410, 426, 428 may be identified by processing unit 210 based on a determined boundary and presented to the user on display 212. In embodiments, each region of interest at least partially enclosed by a determined boundary may be associated with different coloration, shading, etc. A user may interact with user interface 206 of the marine navigation device 202 to select one or more presented region of interests 410, 426 and/or 428 formed by each respective determined boundary as a desired region of interest. Once the region of interest enclosed by a determined boundary 296 has been determined, the user may continue to collect or begin collecting depth data and determine contour map data within each selected region of interest 410, 426 and/or 428.

FIG. 4C illustrates line 430, representing a determined boundary, which may be selected and placed within natural shoreline 440 on body of water 495 at any suitable location. Although illustrated in FIG. 4C as an ellipse, a user may be presented (e.g., via user interface 206 and display 212) with any suitable number regions of interest enclosed by a determined boundary. A user may further adjust the size and position of a selected path 420 shape to define a boundary enclosing region of interest 435. Once region of interest 435 is identified, a user may continue to collect contour map data within region of interest 435. Alternatively, processing unit 210 may cause display 212 to present one or more boundaries or regions of interest 435 for selection by the user via user interface 206. In embodiments, processing unit 210 may recommend a boundary for acceptance by the user with user interface 206.

FIGS. 5A-5C are illustrations of example screenshots of displayed contour map data within a region of interest in accordance with various embodiments of the present disclosure. Each of FIGS. 5A-5C illustrates an example of contour map data that may be presented to a user while navigating a body of water with a marine vessel equipped with a marine navigation device in accordance with the embodiments described herein. For example, the contour map data shown in FIGS. 5A-5C may represent screenshots of contour map data presented via display 212, as shown and discussed with reference to FIG. 2. The contour map data may include a scale 510 associated with contour line data indicating various depths represented by the various numbered contour lines.

As shown in each of FIGS. 5A-5C, each example screenshot includes a marine vessel icon 502 to identify the current location of the marine vessel and to provide additional feedback to the user while obtaining and displaying contour map data. Each of FIGS. 5A-5C also indicates a boundary 504, which is associated with the boundary of region of interest 506. In various embodiments, boundary 504 may correspond to the selection and/or identification of region of interest 506 in accordance with any of the aforementioned techniques (e.g., via a boundary defining mode, user selection of a previously navigated route, manual selection, recommended boundary 296, etc.). Each of FIGS. 5A-5C also includes a region 508 within region of interest 506, for which contour line data has not yet been calculated.

As the marine vessel is navigated through the body of water, additional contour line data may be calculated, stored, and displayed. The depth data and contour line data may be determined for an expanded area including geographic locations adjacent to the current location and displayed, for example, in real-time, as expanded area 512, which may be circular. Processing unit 210 may determine a depth for a first geographic location travelled by marine navigation device 202 within marine vessel 290 and expand the determined depth to adjacent geographic locations near the first geographic location by associating the depth with the adjacent geographic locations. Processing unit 210 may repeat this process for each geographic location traversed by marine navigation device 202 within marine vessel 290. In embodiments, weighting or averaging may be applied to the adjacent geographic locations instead of applying the determined depth for the first geographic location to the adjacent geographic locations.

As shown in FIGS. 5A-5C, the marine vessel is navigating towards region 508 as part of the process of acquiring contour line data within region of interest 506. In other words, FIGS. 5A-5C represent a time-wise succession of a marine vessel acquiring contour line data within region of interest 506, with FIG. 5A showing the marine vessel's earliest position, and FIG. 5C showing the marine vessel's most recent position. Thus, as additional contour line data is calculated and stored, the marine navigation device may display this data instead of the blank areas previously displayed within region 508. As the marine vessel continues to navigate the entire region of interest 506, region 508 may eventually be replaced with contour line data determined by processing unit 210 as these areas are traversed by the marine vessel 502. In other words, region of interest 506 may initially include no data, or be blank (or have some default background shading). As the marine vessel is navigated through a particular body of water, region of interest 506 may "fill in" to represent contour line data that has been calculated by the user.

Figure 6A:
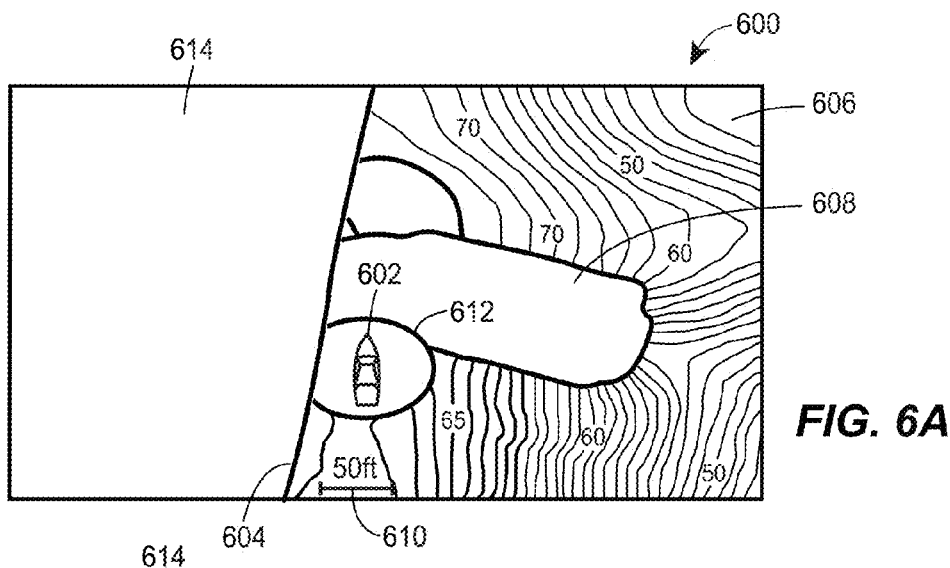
FIGS. 6A-6C are illustrations of example screenshots of selectively displayed contour map data on the boundary of a region of interest in accordance with various embodiments of the present disclosure.
Figure 6B:
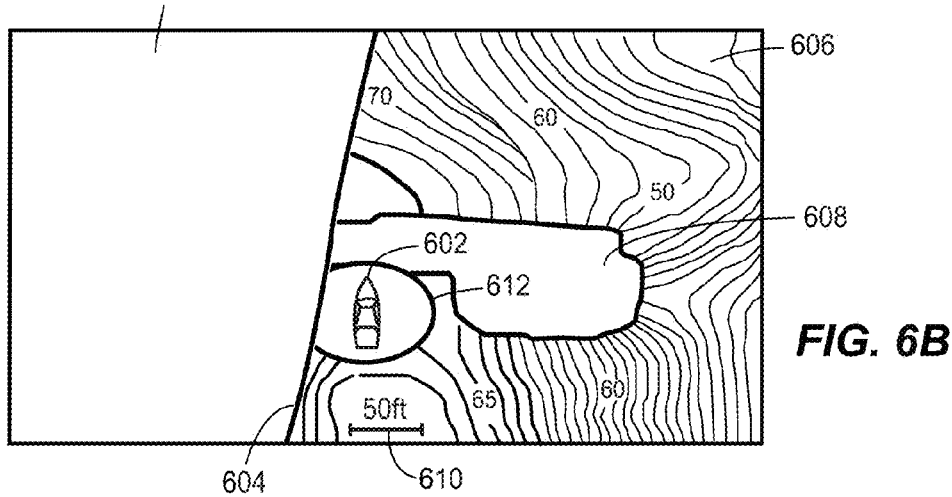
Figure 6C:
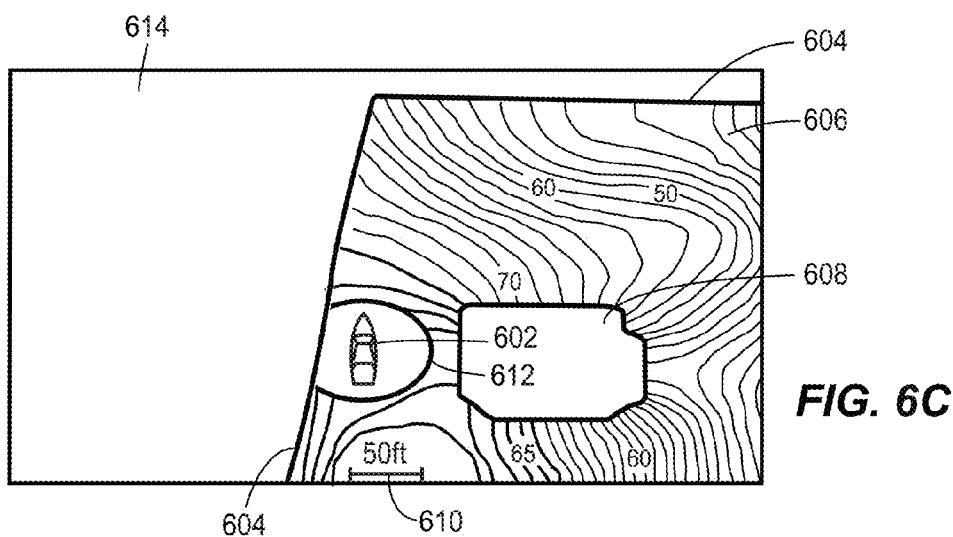

FIGS. 6A-6C are illustrations of example screenshots of selectively displayed contour map data on the boundary of a region of interest in accordance with various embodiments of the present disclosure. As shown in FIGS. 6A-6C, the location of the marine vessel is represented by marine vessel icon 602, and the screenshots of FIGS. 6A-6C illustrate how contour line data may be determined and presented to a user for geographic areas near the boundary of a region of interest. Each of FIGS. 6A-6C shows a progressive time-wise succession of a marine vessel acquiring contour line data.

Processing unit 210 may use boundary 604 as a perimeter enclosing a region of interest 606 associated with only a portion of a body of water (i.e., boundary 604 does not correspond to a natural shoreline along a perimeter of the body of water) and processing unit 210 may be configured to cause display 212 to present a contour map including newly calculated contour line data inside region of interest 606 and contour lines determined based on preloaded contour line data for geographic locations outside of the region of interest. The preloaded contour line data may be stored in memory unit 216. Processing unit 210 may determine and store the contour line data beyond region of interest 606, but only display contour lines based on stored contour line data for geolocations inside region of interest 606 enclosed by boundary 604. Thus, processing unit 210 may control display 212 to present a combination of preloaded contour line data along with contour line data determined by processing unit 210 for the region of interest based on the determined depth data. As shown in FIGS. 6A-6C, the area outside of region of interest 606 does not include the newly calculated contour line data. Although FIGS. 6A-6C show no contour line data in region 614 outside of region of interest 606, embodiments include other types of data being displayed in region 614. For example, as discussed above, region 614 may include preloaded contour line data or other data associated with the body of water other than contour line data.

Furthermore, although not shown in FIGS. 5A-5C and 6A-6C for purposes of brevity, the marine navigation device may present any suitable type of information inside and outside of region of interests 506 and 606 in addition to the contour line data. For example, determined boundaries 504 and 604 may separate the display of newly calculated data inside of region of interests 506 and 606, respectively, such as three-dimensional terrain data, relief shading, etc., as discussed above, but not outside of region of interests 506 and 606. Map data stored in memory unit 216 or no information may be presented between determined boundaries 504, 604 and a natural shoreline. To provide another example, three-dimensional terrain data and/or relief shading may be displayed inside and outside of region of interests 506 and 606, but only updated inside region of interests 506 and 606 as new depth data generated using signals received from sensor array 208 is determined and stored in memory unit 216.

Figure 7:
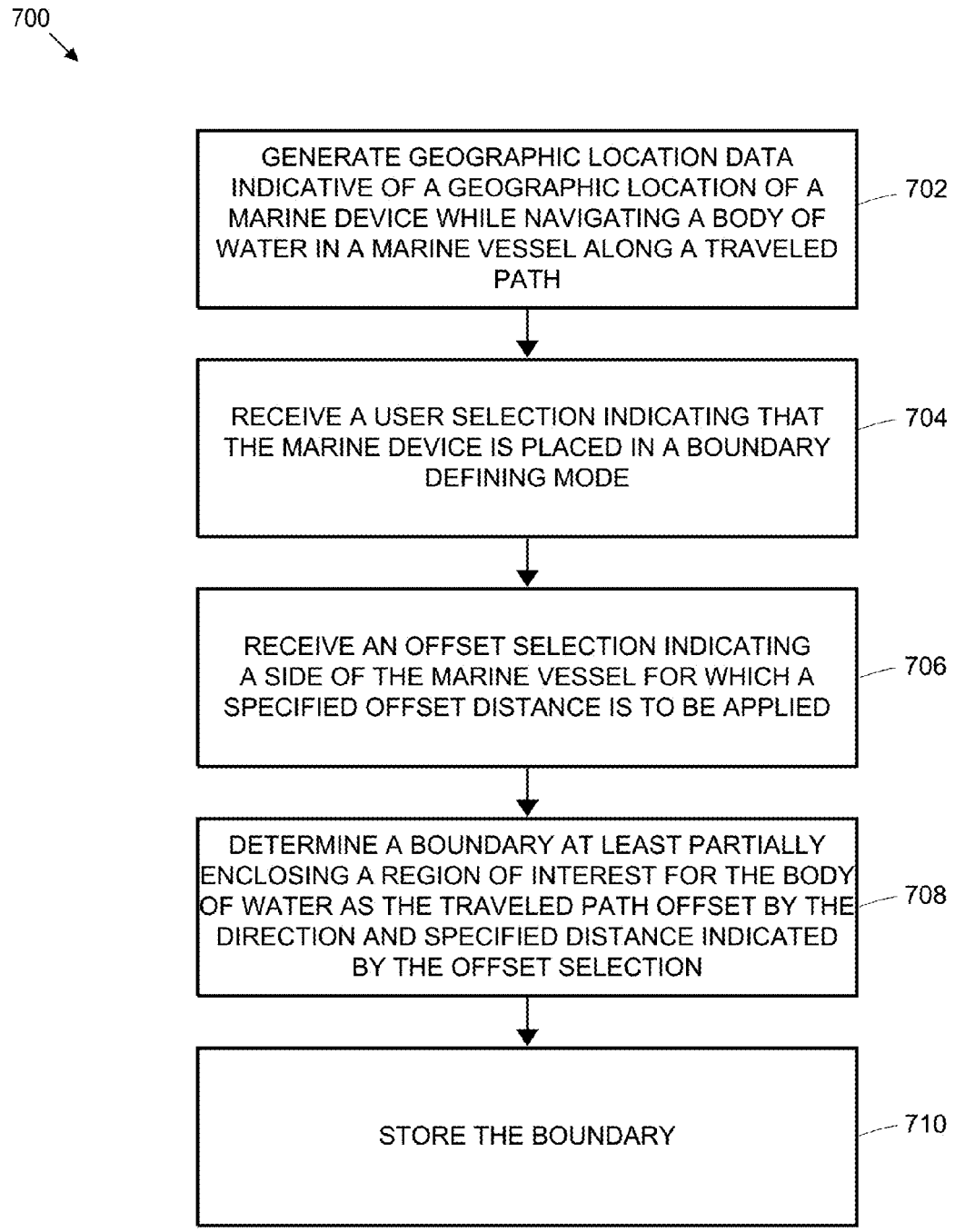
FIG. 7 illustrates a method flow 700, according to an embodiment.

FIG. 7 illustrates a method flow 700, according to an embodiment. In the embodiment, one or more regions of method 700 (or the entire method 700) may be implemented by any suitable device. For example, one or more regions of method 700 may be performed by marine navigation device 202, as shown in FIG. 2. Method 700 may begin when one or more processing units 210 generating geographic location data indicative of a geographic location of a marine device while navigating a body of water along a traveled path. The geographic location data may include, for example, a location determining component such as location determining component 214, for example, as shown in FIG. 2, generating geographic coordinates indicative of a location of the marine navigation device (block 702). The geographic location data may be generated upon the marine navigation device being powered on, for example (block 702). In an embodiment, the geographic location data may be periodically generated and/or stored to a suitable portion of the marine navigation device (block 702).

Method 700 may include one or more processing units 210 receiving a user selection indicating that the marine navigation device has been placed in a boundary defining mode (block 704). This may include, for example, a receiving a user selection placing the marine navigation device into a boundary defining mode via interaction with a user interface (block 704). Method 700 may include one or more processing units 210 determining whether a boundary defining mode has been selected (block 704). Method 700 may include one or more processing units 210 receiving an offset selection indicating a side of the marine vessel for which a specified offset distance is to be applied (block 706). This may include, for example, a receiving a user selection of an offset direction (e.g., port or starboard) and an offset distance via interaction with a user interface (block 704).

Method 700 may include one or more processing units 210 determining a boundary at least partially enclosing a region of interest for the body of water as the traveled path offset by the offset selection, which includes an offset direction and a specified offset distance. Method 700 may include one or more processing units 210 storing the determined boundary in memory unit 216, as shown and discussed above with reference to FIG. 2. This may include, for example, processing units 210 identifying a range of geographic coordinates associated with either the traveled path by the marine vessel in boundary defining mode or the traveled path offset in a specified offset direction and offset distance.

Figure 8:
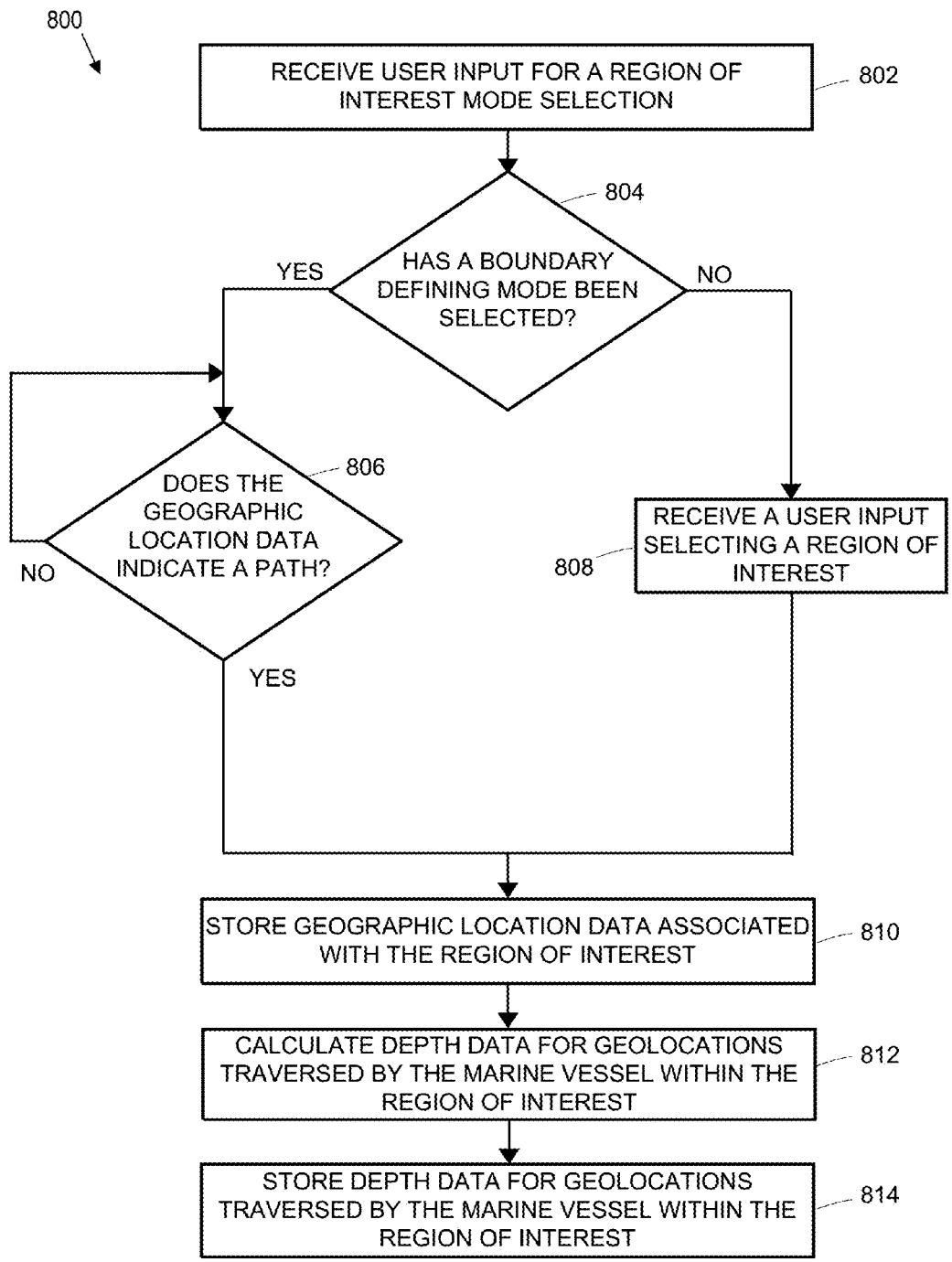
FIG. 8 illustrates a method flow 800, according to an embodiment.

FIG. 8 illustrates a method flow 800, according to an embodiment. In the embodiment, one or more regions of method 800 (or the entire method 800) may be implemented by any suitable device. For example, one or more regions of method 800 may be performed by marine navigation device 202, as shown in FIG. 2.

Method 800 may begin when one or more processing units 210 receive user input for a region of interest mode selection (block 802). The region of interest may be enclosed by a boundary corresponding to a natural shoreline along the perimeter of a body of water or boundary enclosing a portion of the body of water (e.g., an area distant from the natural shoreline). The user may, for example, interact with a suitable user interface of marine navigation device (e.g., user interface 206, as shown in FIG. 2) to place the marine navigation device 202 into one of several modes of operation to facilitate the identification and/or selection of a region of interest (block 802).

Method 800 may include one or more processing units 210 determining whether a boundary defining mode has been selected (block 804). If the boundary defining mode has been selected, then method 700 may proceed to determining geographic locations associated with boundary 296 enclosing a region of interest, via monitoring of geographic location data (block 806). If boundary defining mode has not been selected, then method 800 may proceed to receiving a user identification of a region of interest or a boundary 296 enclosing the region of interest (block 808). Method 800 may include one or more processing units 210 determining whether the geographic location data indicates a traveled path (block 806). This may include, for example, the one or more processors tracking geographic location data generated via a location determining component, such as location determining component 214, for example, as shown in FIG. 2 (block 806). The one or more processors may analyze the geographic location data for a route traveled by the marine vessel until a suitable boundary may be determined within the route (block 806). For example, once the marine navigation device enters into boundary defining mode, the geographic location data may be stored and used to trace out a route, which may be presented to the user or otherwise analyzed for one or more regions of interest (block 806). If a suitable path has been traveled by a marine vessel, then method 800 may proceed to storing the geographic location data associated with a boundary 296 and/or a region of interest enclosed by boundary 296 (block 810). If not, then method 800 may include one or more processing units 210 continuing to monitor the geographic location data until a traveled path that may be suitable as a boundary 296 at least partially enclosing a region of interest is detected (block 806).

Method 800 may include one or more processors receiving a user input selecting the region of interest (block 808). As discussed above with reference to FIGS. 4A-4C, this may include a user selecting a boundary 296 enclosing a region of interest from a history of displayed routes or a user manually defining a boundary 296 enclosing a region of interest by manually selecting a desired shape and size of a boundary 296 or a region of interest enclosed by a boundary 296 (block 808). Once a user selection has been received, then method 800 may proceed to storing the geographic location data associated with the boundary 296 and/or the region of interest (block 810).

Method 800 may include one or more processors storing the geographic location data associated with the boundary 296 and/or the region of interest (block 810). This may include, for example, identifying a range of geographic coordinates associated with either the traveled path by the marine vessel in boundary defining mode (block 806) or the user's selection of a region of interest (block 808). These geographic coordinates may be associated with a boundary 296 enclosing the region of interest (block 810).

Method 800 may include one or more processors calculating depth data for geolocations traversed by the marine vessel within the region of interest (block 812). This calculation may be performed, for example, utilizing signals received from a depth data transducer, such as a SONAR transducer, for example (block 812). Method 800 may include one or more processors analyzing or otherwise processing these signals to calculate the depth of the water beneath the marine vessel 290 at various geolocations as indicated by the depth data (block 812). In an embodiment, method 800 may include one or more processors calculating the depth data when the marine vessel is located within the region of interest, and otherwise not calculating the depth data (block 812).

Method 800 may include one or more processors storing the calculated depth data for geolocations traversed by the marine vessel within the region of interest (block 812) in a suitable associated memory unit (block 814). This may include, for example, marine navigation device 202 storing the depth data for various geolocations within the region of interest in memory unit 216, as shown and discussed above with reference to FIG. 2. In an embodiment, method 800 may include one or more processors storing the depth data for geolocations associated with the marine vessel when the marine navigation device 202 is determined to be located within the region of interest, and otherwise not storing the depth data (block 814).

Figure 9:
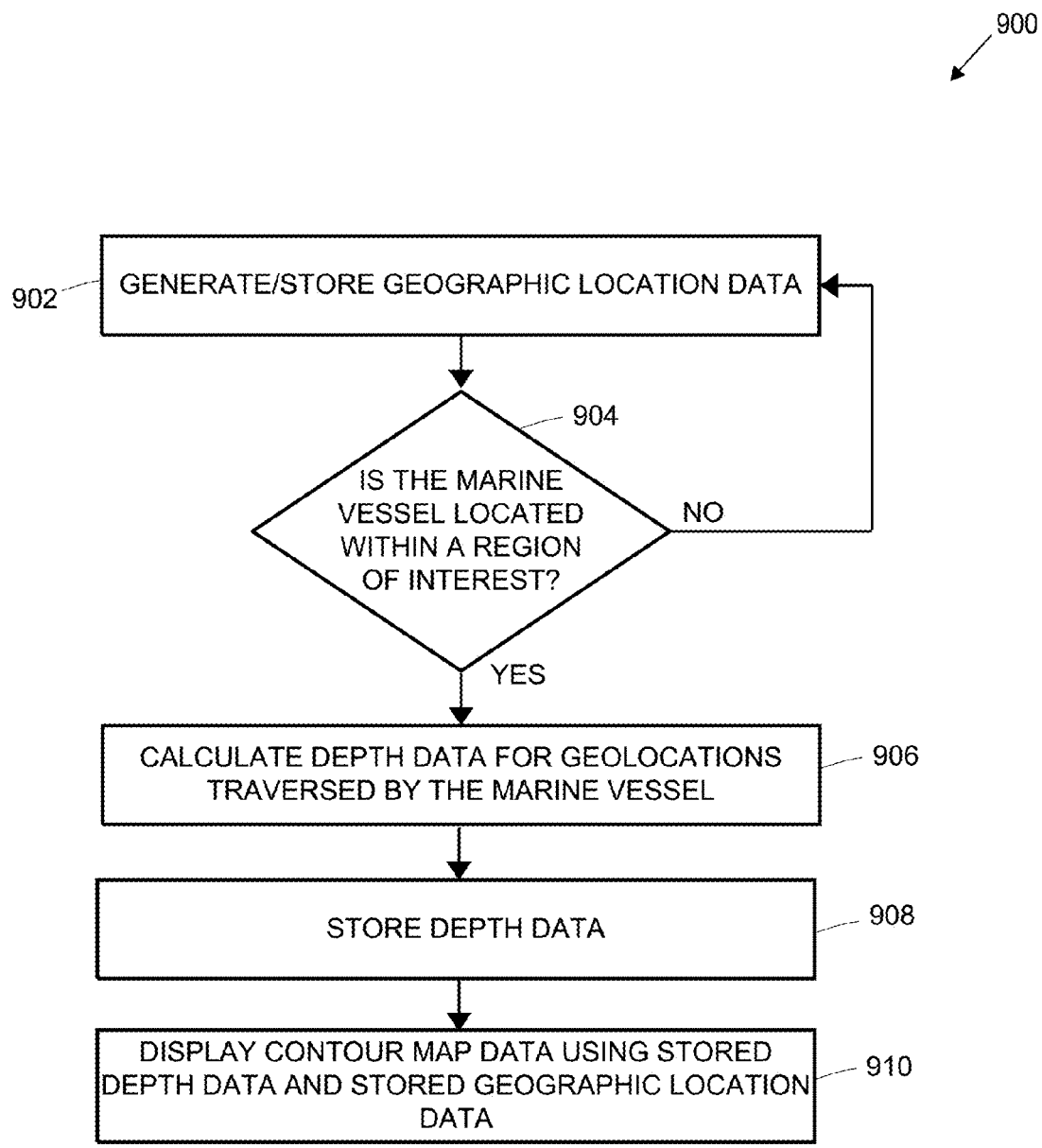
FIG. 9 illustrates a method flow 900, according to an embodiment.

FIG. 9 illustrates a method flow 900, according to an embodiment. In an embodiment, one or more regions of method 900 (or the entire method 900) may be implemented by any suitable device. For example, one or more regions of method 900 may be performed by marine navigation device 202, as shown in FIG. 2. Method 900 may start when one or more processing units 210 generate and/or store geographic location data (block 902). Method 900 may include one or more processors determining whether the marine vessel is located within a region of interest enclosed by a boundary 296 (block 904). The region of interest and boundary 296 may be received and stored in any suitable portion of the marine navigation device. In an embodiment, the region of interest may be selected, generated, and/or stored in accordance with the techniques described herein, including those described with reference to methods 700 and 800. The determination may include one or more processors comparing the location of the marine vessel to the location of a traveled path at least partially enclosing the region of interest (block 904). If it is determined that the marine vessel is within the boundary 296 enclosing the region of interest, then method 900 may proceed to calculate and store the depth data and to display the contour map data (blocks 906, 908, 910). If not, then method 900 may revert back to generating and/or storing geographic location data (block 902) until it is determined that the marine vessel is located within the region of interest enclosed by boundary 296 (block 904).

When it is determined that the marine vessel is located within the region of interest, method 900 may include one or more processors calculating depth data for geolocations traversed by the marine vessel (block 906). These calculations may be performed, for example, utilizing signals received from a depth data transducer, such as a SONAR transducer, for example (block 906). Method 900 may include one or more processors analyzing or otherwise processing these signals to calculate the depth of the water beneath the marine vessel at various geolocations as indicated by the depth data (block 906).

Method 900 may include one or more processors storing the calculated depth data for geolocations traversed by the marine vessel (block 906) in a suitable associated memory unit (block 908). This may include, for example, marine navigation device 202 storing the depth data for various geolocations traversed by the marine vessel, as shown and discussed above with reference to FIG. 2 (block 908).

Method 900 may include one or more processors displaying contour map data using the stored depth data and the stored geographic location data (block 910). Because the depth data is not calculated and stored until it is determined that the marine vessel is located within the region of interest enclosed by boundary 296 (block 904), method 900 may display the contour map data within the region of interest but not outside of the region of interest (block 910). In embodiments, contour lines based on preloaded contour line data may be presented on the map for geographic areas outside boundary 296.

Again, the displayed contour map data may include, for example, contour line data that is calculated based on the stored depth data (block 910). The contour map data may also be displayed in accordance with the stored geographic location data such that the contour map data may be overlaid or otherwise correlated to the geographic location data (block 910). Furthermore, the contour map data may additionally include three-dimensional terrain data and/or relief shading data, as discussed herein (block 910). In this way, the region of interest may function as a boundary that triggers not only the calculation and storage of depth data, but whether contour map data is displayed as well.

It should be understood that, unless a term is expressly defined in this patent application using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

Although the foregoing text sets forth a detailed description of numerous different embodiments, it should be understood that the detailed description is to be construed as exemplary only and does not describe every possible embodiment because describing every possible embodiment would be impractical, if not impossible. In light of the foregoing text, numerous alternative embodiments may be implemented, using either current technology or technology developed after the filing date of this patent application. It is noted that equivalents may be employed and substitutions made herein without departing from the scope of the technology.

What is claimed is:

1. A marine device located within a marine vessel, the marine device comprising:
   a display;
   a memory unit configured to store an offset direction and an offset distance associated with a boundary defining mode;
   a location determining component configured to generate geographic location data indicative of a geographic location of the marine device while the marine vessel navigates a body of water having a natural shoreline along a perimeter of the body of water;
   a user interface configured to receive the offset direction and the offset distance from the traveled path to the natural shoreline; and
   a processing unit coupled with the display, the location determining component, and the memory unit, the processing unit configured to:
      determine a path traveled by the marine vessel based on the geographic location data,
      determine an offset based on the offset direction and the offset distance,
      determine a boundary formed by applying the determined offset to the traveled path, the determined boundary at least partially enclosing a region of interest and corresponding to the natural shoreline,
      associate a water depth of zero with the determined boundary, and
      cause the display to present a map including the region of interest;
   wherein the offset direction is a side of the marine vessel for which the offset distance is to be applied.

2. The marine device of claim 1, wherein the user interface is further configured to receive a user selection placing the marine device into the boundary defining mode.

3. The marine device of claim 1, wherein the determined boundary is associated with a plurality of geographic locations that cannot be traveled by the marine vessel.

4. The marine device of claim 3, wherein the memory unit is further configured to store preloaded contour line data, and wherein the processing unit is further configured to cause the display to present the contour map including the preloaded contour line data for geographic locations outside of the region of interest.

5. The device of claim 1, wherein the processing unit is further configured to store the determined boundary in the memory unit.

6. The marine device of claim 1, wherein the offset distance is in units of feet or nautical miles.

7. The marine device of claim 6, wherein the offset direction is one of a port and a starboard of the marine vessel.

8. The marine device of claim 1, wherein the memory unit is further configured to store a map including the body of water, and wherein the processing unit is further configured to automatically identify a natural shoreline of the body of water based on the stored map and to determine the boundary enclosing the region of interest as the identified shoreline in the boundary defining mode.

9. The marine device of claim 8, wherein the processing unit automatically identifies the natural shoreline by identifying geographic locations along the perimeter of the body of water.

10. The marine device of claim 1, wherein the processing unit is further configured to:
   receive signals from a SONAR transducer as the marine vessel navigates the body of water, and
   calculate depth data for geographic locations traveled by the marine vessel based on the received signals and store the calculated depth data in the memory unit.

11. The marine device of claim 10, wherein the processing unit is further configured to calculate contour line data based upon the calculated depth data, the contour line data indicating geolocations of underwater terrain existing at a depth of the body of water.

12. The marine device of claim 11, wherein the processing unit is further configured to cause the display to present the calculated contour lines for geographic locations within the region of interest on the map, the map including the calculated contour lines being a contour map.

13. A marine device located within a marine vessel, the marine device comprising:
   a display;
   a memory unit configured to store an offset direction and an offset distance associated with a boundary defining mode;
   a location determining component configured to generate geographic location data indicative of a geographic location of the marine device while the marine vessel navigates a body of water having a natural shoreline along a perimeter of the body of water;
   a user interface configured to receive the offset direction and the offset distance from the traveled path to the natural shoreline; and
   a processing unit coupled with the display, the location determining component, the user interface, and the memory unit, the processing unit configured to:
      determine a path traveled by the marine vessel based on the geographic location data,
      determine an offset based on the offset direction and the offset distance,
      determine a boundary formed by applying the determined offset to the traveled path, the determined boundary at least partially enclosing a region of interest and corresponding to the natural shoreline,
      associate a water depth of zero with the determined boundary, and
      control the display to present a map including the region of interest;
   wherein the offset direction is a side of the marine vessel for which the offset distance is to be applied.

14. The marine device of claim 13, wherein the user interface is further configured to receive a user selection placing the marine device into the boundary defining mode.

15. The marine device of claim 13, wherein the offset distance is in units of feet or nautical miles.

16. The marine device of claim 15, wherein the processing unit is further configured to store the determined boundary in the memory unit, and wherein the offset direction is one of a port and a starboard of the marine vessel.

17. The marine device of claim 13, wherein the memory unit is further configured to store a map including the body of water, and wherein the processing unit is further configured to automatically identify a natural shoreline of the body of water based on the stored map and to determine the boundary enclosing the region of interest as the automatically identified shoreline in the boundary defining mode.

18. The marine device of claim 17, wherein the processing unit automatically identifies the natural shoreline by identifying geographic locations along the perimeter of the body of water.

19. The marine device of claim 13, wherein the processing unit is further configured to:
   receive signals from a SONAR transducer as the marine vessel navigates the body of water, and
   calculate depth data for geographic locations traveled by the marine vessel based on the received signals and store the calculated depth data in the memory unit.

20. The marine device of claim 19, wherein the processing unit is further configured to:
   calculate contour line data based upon the calculated depth data, the contour line data indicating geolocations of underwater terrain existing at a depth of the body of water, and
   cause the display to present the calculated contour lines for geographic locations within the region of interest on the map, the map including the calculated contour lines being a contour map.

21. The marine device of claim 13, wherein the determined boundary is associated with a plurality of geographic locations that cannot be traveled by the marine vessel.

* * * * *